US010508709B2

(12) United States Patent
Oi et al.

(10) Patent No.: US 10,508,709 B2
(45) Date of Patent: Dec. 17, 2019

(54) VIBRATION DAMPING DEVICE AND METHOD FOR DESIGNING THE SAME

(71) Applicants: AISIN AW CO., LTD., Anjo-shi, Aichi-ken (JP); NATIONAL UNIVERSITY CORPORATION OITA UNIVERSITY, Oita, Oita-Pref (JP); Kagoshima University, Kagoshima-shi, Kagoshima (JP)

(72) Inventors: Yoichi Oi, Ama (JP); Masaki Wajima, Nagoya (JP); Hiroki Nagai, Anjo (JP); Takao Sakamoto, Anjo (JP); Takahiro Ryu, Oita (JP); Takashi Nakae, Oita (JP); Kenichiro Matsuzaki, Kagoshima (JP)

(73) Assignees: AISIN AW CO., LTD., Anjo-shi, Aichi-ken (JP); NATIONAL UNIVERSITY CORPORATION OITA UNIVERSITY, Oita, Oita-Pref (JP); Kagoshima University, Kagoshima-shi, Kagoshima (JP)

(*) Notice: Subject to any disclaimer, the term of this patent is extended or adjusted under 35 U.S.C. 154(b) by 0 days.

(21) Appl. No.: 16/321,554

(22) PCT Filed: Sep. 29, 2017

(86) PCT No.: PCT/JP2017/035652
§ 371 (c)(1),
(2) Date: Jan. 29, 2019

(87) PCT Pub. No.: WO2018/062536
PCT Pub. Date: Apr. 5, 2018

(65) Prior Publication Data
US 2019/0226552 A1 Jul. 25, 2019

(30) Foreign Application Priority Data
Sep. 29, 2016 (JP) ................. 2016-191767

(51) Int. Cl.
F16F 15/14 (2006.01)
F16F 15/137 (2006.01)
(Continued)

(52) U.S. Cl.
CPC ........ F16F 15/145 (2013.01); F16F 15/1202 (2013.01); F16F 15/137 (2013.01);
(Continued)

(58) Field of Classification Search
CPC ........ F16F 15/10; F16F 15/12; F16F 15/1202; F16F 15/131; F16F 15/13128;
(Continued)

(56) References Cited

U.S. PATENT DOCUMENTS

2010/0242466 A1 9/2010 Krause et al.
2016/0245365 A1* 8/2016 Movlazada ........... F16F 15/145
(Continued)

FOREIGN PATENT DOCUMENTS

DE 10 2012 212 854 A1 2/2013
EP 3 163 117 A1 5/2017
(Continued)

OTHER PUBLICATIONS

International Search Report for PCT/JP2017/035652 dated Oct. 31, 2017 [PCT/ISA/210].

Primary Examiner — Prasad V Gokhale
(74) Attorney, Agent, or Firm — Sughrue Mion, PLLC

(57) ABSTRACT

In a vibration damping device 20, the moment of inertia $J_1$ of a driven member 15, the moment of inertia $J_2$ of an inertial mass body 23, the mass m of crank members 22, the distance L3 between the center of gravity G of the crank member 22 and the fulcrum of swinging of the crank member 22 with respect to the inertial mass body 23, and the distance L4 between this fulcrum and the center of rotation RC are determined so that torque fluctuation of an object for which
(Continued)

vibration is to be damped, which is derived based on angular displacement and angles obtained by solving an equation of motion for the driven member 15 and an equation of motion for the entire vibration damping device 20 is equal to a target value.

20 Claims, 17 Drawing Sheets

(51) Int. Cl.
  F16H 45/02 (2006.01)
  F16F 15/12 (2006.01)
  F16F 15/131 (2006.01)
(52) U.S. Cl.
  CPC ........ F16F 15/13128 (2013.01); F16F 15/14 (2013.01); F16H 45/02 (2013.01); *F16F 2228/001* (2013.01)

(58) Field of Classification Search
  CPC ........ F16F 15/137; F16F 15/14; F16F 15/145; F16F 15/30; F16F 2228/001; F16H 45/02
  See application file for complete search history.

(56) References Cited

U.S. PATENT DOCUMENTS

| 2017/0037929 | A1 | 2/2017 | Takikawa et al. |
| 2018/0372182 | A1* | 12/2018 | Takikawa .............. F16F 15/134 |
| 2019/0003554 | A1* | 1/2019 | Nagai ................. F16F 15/1471 |
| 2019/0024752 | A1* | 1/2019 | Oi ......................... F16F 15/134 |

FOREIGN PATENT DOCUMENTS

| JP | 01-312246 A | 12/1989 |
| JP | 2001-263424 A | 9/2001 |
| JP | 2015-224762 A | 12/2015 |
| JP | 2016-014425 A | 1/2016 |
| WO | 2015/108130 A1 | 7/2015 |
| WO | 2016/047789 A1 | 3/2016 |

* cited by examiner

VIBRATION DAMPING DEVICE AND METHOD FOR DESIGNING THE SAME

CROSS REFERENCE TO RELATED APPLICATIONS

This application is a National Stage of International Application No. PCT/JP2017/035652 filed Sep. 29, 2017, claiming priority based on Japanese Patent Application No. 2016-191767 filed Sep. 29, 2016.

TECHNICAL FIELD

Aspects of the present disclosure relate to vibration damping devices including a restoring force generating member that can swing as a support member rotates and an inertial mass body that is coupled to the support member via the restoring force generating member and swings with motion of the restoring force generating member as the support member rotates, and methods for designing the same.

BACKGROUND ART

Conventionally, a vibration damping device including a flywheel mass body that receives a centrifugal force and functions as a restoring force generating member and an annular inertial mass body coupled to the flywheel mass body via a connecting rod is known as this type of vibration damping device (see, e.g., Patent Document 1). In such a vibration damping device, as the flywheel mass body swings with rotation of a support member, the inertial mass body swings with the swinging motion of the flywheel mass body, and vibration of the support member can be dampened by vibration that is transmitted from the inertial mass body to the support member. A centrifugal pendulum rotational speed-adaptive dynamic vibration absorber including a support member coupled to a rotary element that is rotated by power from a drive device and mass bodies that are coupled to the support member and swing about a pendulum fulcrum is also known as a vibration damping device (see, e.g., Patent Document 2). This rotational speed-adaptive dynamic vibration absorber is designed to have an effective order qeff that is larger than the order q of excitation of a drive device by a predetermined order offset value qF in view of the influence of oil.

RELATED ART DOCUMENTS

Patent Documents

Patent Document 1: German Patent Application Publication No. 102012212854
Patent Document 2: Published Japanese Translation of PCT Application No. 2011-504987 (JP 2011-504987 A)

SUMMARY

In the rotational speed-adaptive dynamic vibration absorber described in Patent Document 2, the effective order qeff is made larger than the excitation order q of the drive device by the predetermined order offset value qF in view of resistance (viscous resistance) to relative motion of the mass bodies with respect to rotating oil in order to make the order of vibration that can be most satisfactorily damped by the dynamic vibration absorber equal to the excitation order q. When designed in this manner, centrifugal pendulum vibration damping devices can basically have satisfactorily vibration damping capability. On the other hand, vibration damping devices including such an inertial mass body as described in Patent Document 1 may not have satisfactorily vibration damping capability even if the order of vibration that can be most satisfactorily damped by the vibration damping device is made equal to the excitation order of a drive device. There is still room for improvement in terms of more properly setting the order to improve vibration damping capability.

It is an aspect of the present disclosure to further improve vibration damping capability of a vibration damping device including a restoring force generating member and an inertial mass body that swings with the motion of the restoring force generating member.

A vibration damping device of the present disclosure is a vibration damping device including a support member that rotates, together with a rotary element to which torque from an engine is transferred, about a center of rotation of the rotary element, a restoring force generating member that is coupled to the support member and that is swingable as the support member rotates, and an inertial mass body that is coupled to the support member via the restoring force generating member and that swings, with motion of the restoring force generating member, about the center of rotation as the support member rotates, wherein moments of inertia $J_1$, $J_2$, mass m, and distances $L_3$ and $L_4$ are determined so that torque fluctuation of an object for which vibration is to be damped, which is derived based on angular displacement $\delta$ and angles $\zeta$ and $\theta$ obtained by solving the following expressions (A) and (B), is equal to a target value

[Expression 1]

$$J_1 \cdot \ddot{\delta} + (J_2 + m \cdot L_4^2) \cdot (\ddot{\delta} + \ddot{\theta}) + m \cdot L_3^2 \cdot (\ddot{\delta} + \zeta' \cdot \ddot{\theta} + \zeta'' \cdot \dot{\theta}^2) + \\ m \cdot L_4 \cdot L_3 \cdot [2 \cdot \ddot{\delta} + (1+\zeta') \cdot \ddot{\theta} + \zeta'' \cdot \dot{\theta}^2] \cdot \cos(\theta - \zeta) - m \cdot L_4 \cdot L_3 \cdot \\ [2 \cdot (\dot{\Omega} + \dot{\delta}) + (1+\zeta') \cdot \dot{\theta}] \cdot (1-\zeta') \cdot \dot{\theta} \cdot \sin(\theta - \zeta) + k \cdot \delta = T_d \cdot \cos \omega \cdot r \quad (A)$$

$$(J_2 + m \cdot L_4^2) \cdot (\ddot{\delta} + \ddot{\theta}) + m \cdot L_3^2 \cdot \zeta' \cdot (\ddot{\delta} + \zeta' \cdot \ddot{\theta} + \zeta'' \cdot \dot{\theta}^2) + m \cdot L_4 \cdot L_3 \cdot \\ [(1+\zeta') \cdot \ddot{\delta} + 2 \cdot \zeta' \cdot \ddot{\theta} + \zeta'' \cdot \dot{\theta}^2] \cdot \cos(\theta - \zeta) + m \cdot L_4 \cdot L_3 \cdot \\ [(\dot{\Omega} + \dot{\delta})^2 - \zeta' \cdot \dot{\theta}^2] \cdot (1+\zeta') \cdot \sin(\theta - \zeta) = 0 \quad (B)$$

where "$L_3$" represents a distance between a center of gravity of the restoring force generating member and a fulcrum of swinging of the restoring force generating member with respect to the inertial mass body, "$L_4$" represents a distance between the fulcrum and the center of rotation, "$J_1$" represents a moment of inertia of the rotary element and the support member, "$J_2$" represents a moment of inertia of the inertial mass body, "m" represents mass of the restoring force generating member, "k" represents stiffness of a system from the engine to the rotary element, "$\Omega$" represents an angular velocity of steady rotation of the rotary element, "$\delta$" represents angular displacement of the rotary element from a steady rotation state, "$\zeta$" represents an angle formed by a reference line defined on the support member and extending in a radial direction of the support member through the center of rotation and a line segment from the fulcrum of swinging of the restoring force generating member with respect to the inertial mass body to the center of gravity of the restoring force generating member, "$\theta$" represents an angle formed by the reference line and a line segment from the center of rotation to the fulcrum, "Td" represents torque that is transferred from the engine to the rotary element, and "$\omega$" represents a frequency of vibration that is transmitted from the engine to the rotary element.

Studies conducted by the inventors show that, in vibration damping devices including a restoring force generating member and an inertial mass body that swings with motion of the restoring force generating member, vibration damping capability can be improved by making a reference order, namely a value to which an order of the vibration damping device converges as amplitude of vibration of input torque decreases, larger than an excitation order of an engine rather than by making the reference order equal to the excitation order. In the vibration damping device of the present disclosure, the moments of inertia $J_1$, $J_2$, the mass m, and the distances $L_3$ and $L_4$ are determined so that the torque fluctuation of the object for which vibration is to be damped, which is derived based on the angular displacement δ and the angles ζ and θ obtained by solving the expressions (A) and (B), is equal to the target value. In the vibration damping device of the present disclosure, the reference order can thus be made to fall within a proper range that is larger than the excitation order of the engine, whereby the vibration damping capability is further improved.

PREFERRED EMBODIMENTS

Modes for carrying out the various aspects of the present disclosure will be described below with reference to the accompanying drawings.

Figure 1:
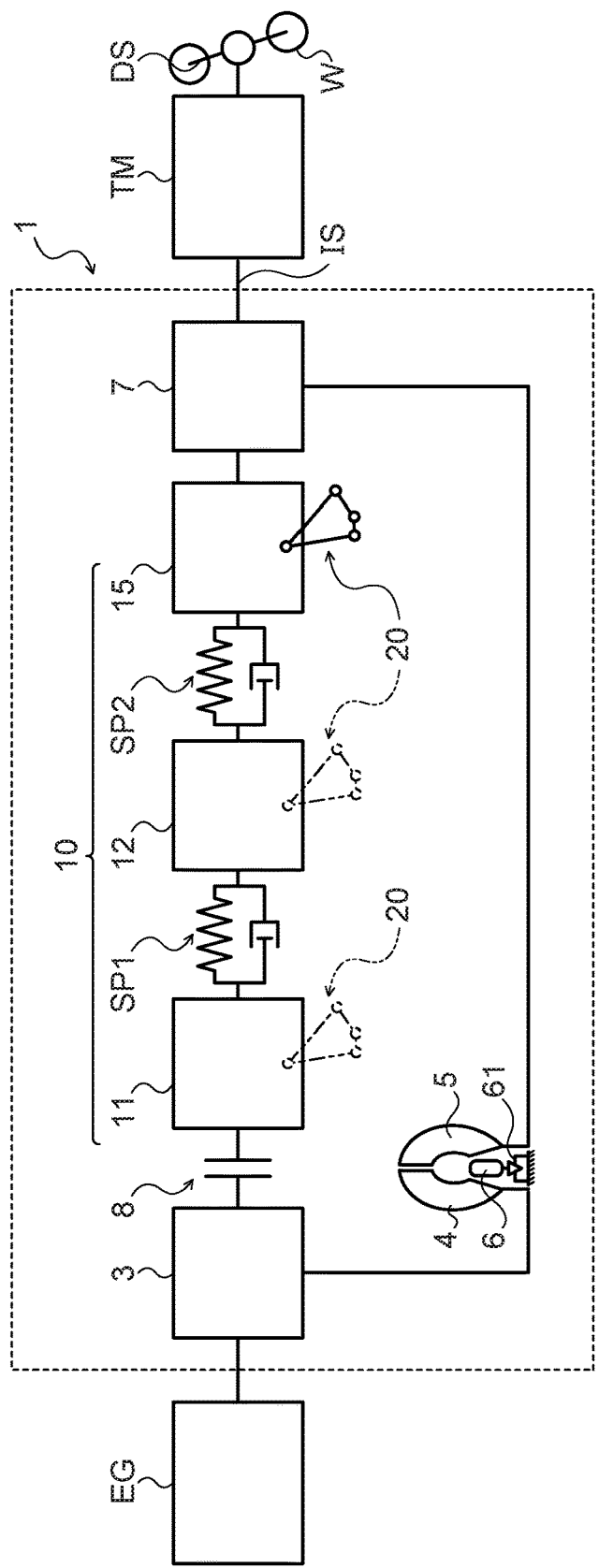
FIG. 1 is a schematic configuration diagram of a starting device including a vibration damping device of the present disclosure.

FIG. 1 is a schematic configuration diagram of a starting device 1 including a vibration damping device 20 of the present disclosure. The starting device 1 shown in the figure is mounted on, e.g., a vehicle including an engine (internal combustion engine) EG serving as a drive device, and serves to transfer power from the engine EG to a drive shaft DS of the vehicle. The starting device 1 includes, in addition to the vibration damping device 20, a front cover 3 coupled to a crankshaft of the engine EG and serving as an input member, a pump impeller (input-side hydraulic transmission element) 4 that is fixed to the front cover 3 and rotates together with the front cover 3, a turbine runner (output-side hydraulic transmission element) 5 that can rotate coaxially with the pump impeller 4, a damper hub 7 fixed to an input shaft IS of a transmission (power transmission device) TM, which is an automatic transmission (AT), a continuously variable transmission (CVT), a dual clutch transmission (DCT), a hybrid transmission, or a speed reducer, and serving as an output member, a lockup clutch 8, a damper device 10, etc.

In the following description, the "axial direction" basically refers to the direction in which the central axis (axis) of the starting device 1 or the damper device 10 (vibration damping device 20) extends, unless otherwise specified. The "radial direction" basically refers to the radial direction of the starting device 1, the damper device 10, or rotary elements of the damper device 10 etc., namely the direction of a straight line extending from the central axis of the starting device 1 or the damper device 10 perpendicularly to this central axis (in the direction of the radius), unless otherwise specified. The "circumferential direction" basically refers to the circumferential direction of the starting device 1, the damper device 10, or the rotary elements of the damper device 10 etc., namely the direction along the rotation direction of the rotary elements, unless otherwise specified.

Figure 2:
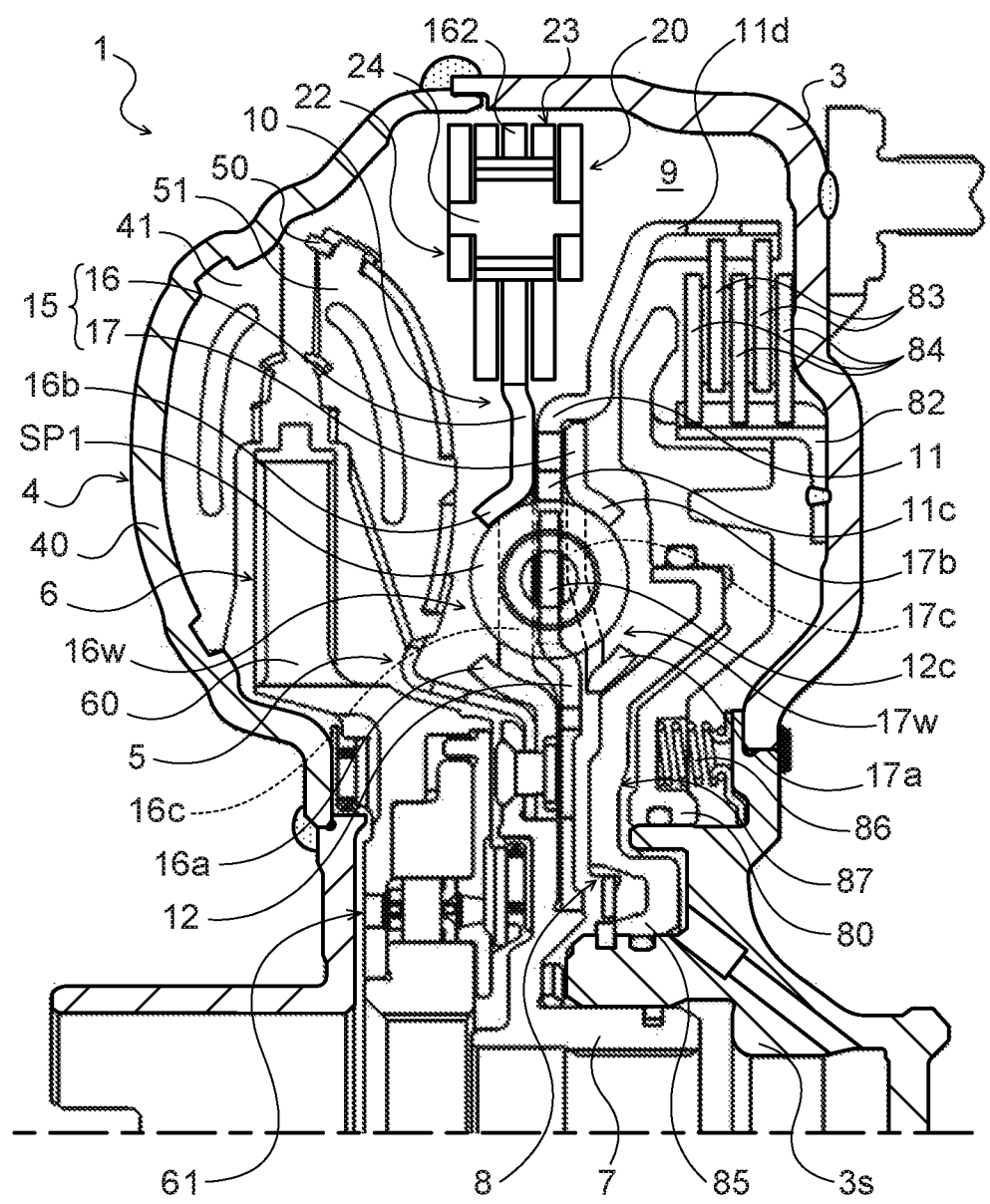
FIG. 2 is a sectional view of the starting device shown in FIG. 1.

As shown in FIG. 2, the pump impeller 4 has a pump shell 40 firmly fixed to the front cover 3, and a plurality of pump blades 41 disposed on the inner surface of the pump shell 40. As shown in FIG. 2, the turbine runner 5 has a turbine shell 50 and a plurality of turbine blades 51 disposed on the inner surface of the turbine shell 50. An inner peripheral part of the turbine shell 50 is fixed to the damper hub 7 via a plurality of rivets.

The pump impeller 4 and the turbine runner 5 face each other, and a stator 6 that adjusts the flow of hydraulic oil (working fluid) from the turbine runner 5 to the pump impeller 4 is disposed coaxially between the pump impeller 4 and the turbine runner 5. The stator 6 has a plurality of stator blades 60, and the stator 6 is allowed to rotate only in one direction by a one-way clutch 61. The pump impeller 4, the turbine runner 5, and the stator 6 form a torus (annular flow path) in which hydraulic oil is circulated, and function as a torque converter (hydraulic transmission device) having a function to amplify torque. In the starting device 1, the stator 6 and the one-way clutch 61 may be omitted, and the pump impeller 4 and the turbine runner 5 may function as a fluid coupling.

The lockup clutch 8 is a hydraulic multi-plate clutch. The lockup clutch 8 performs lockup coupling, namely couples the front cover 3 to the damper hub 7, i.e., the input shaft IS of the transmission TM, via the damper device 10, and releases the lockup coupling. The lockup clutch 8 includes: a lockup piston 80 that is supported by a centerpiece 3s fixed to the front cover 3 so that the lockup piston 80 can move in the axial direction; a drum portion 11d that is integral with a drive member 11, namely an input element of the damper device 10, and serves as a clutch drum; an annular clutch hub 82 that is fixed to the inner surface of the front cover 3 so as to face the lockup piston 80; a plurality of first friction engagement plates (friction plates having a friction material on both surfaces thereof) 83 that are fitted on splines formed in the inner periphery of the drum portion 11d; and a plurality of second friction engagement plates (separator plates) 84 that are fitted on splines formed in the outer peripheral surface of the clutch hub 82.

The lockup clutch 8 further includes: an annular flange member (oil chamber defining member) 85 that is attached to the centerpiece 3s of the front cover 3 so as to be located on the opposite side of the lockup piston 80 from the front cover 3, namely so as to be located closer to the damper device 10 than the lockup piston 80 is; and a plurality of return springs 86 that are disposed between the front cover 3 and the lockup piston 80. As shown in the figure, the lockup piston 80 and the flange member 85 defines an engagement oil chamber 87, and hydraulic oil (engagement oil pressure) is supplied from a hydraulic control device, not shown, to the engagement oil chamber 87. By increasing the engagement oil pressure that is supplied to the engagement oil chamber 87, the lockup piston 80 is moved in the axial direction so as to press the first and second friction engagement plates 83, 84 toward the front cover 3, whereby the lockup clutch 8 is engaged (fully engaged or slip-engaged). The lockup clutch 8 may be a hydraulic single-plate clutch.

As shown in FIGS. 1 and 2, the damper device 10 includes, as the rotary elements, the drive member (input element) 11 including the drum portion 11d, an intermediate member (intermediate element) 12, and a driven member (output element) 15. The damper device 10 further includes, as torque transmission elements, a plurality of first springs (first elastic bodies) SP1 and a plurality of second springs (second elastic bodies) SP2 (e.g., four each in the present embodiment) which are alternately arranged on the same circumference at intervals in the circumferential direction. The first and second springs SP1, SP2 are arc coil springs made of a metal material wound so as to have an axis in the shape of a circular arc when not under load, or straight coil springs made of a metal material wound in a helical pattern so as to have a straight axis when not under load. As shown in the figures, the first and second springs SP1, SP2 may be what is called dual springs.

The drive member 11 of the damper device 10 is an annular member including the drum portion 11d in its outer periphery, and has a plurality of (e.g., four at 90° intervals in the present embodiment) spring contact portions 11c extended radially inward from its inner peripheral portion at intervals in the circumferential direction. The intermediate member 12 is an annular plate-like member and has a plurality of (e.g., four at 90° intervals in the present embodiment) spring contact portions 12c extended radially inward from its outer peripheral portion at intervals in the circumferential direction. The intermediate member 12 is rotatably supported by the damper hub 7, and is disposed radially inside the drive member 11 and surrounded by the drive member 11.

As shown in FIG. 2, the driven member 15 includes an annular first driven plate 16 and an annular second driven plate 17 coupled to the first driven plate 16 via a plurality of rivets, not shown, so as to rotate therewith. The first driven plate 16 is a plate-like annular member and is disposed closer to the turbine runner 5 than the second driven plate 17 is. The first driven plate 16 together with the turbine shell 50 of the turbine runner 5 is fixed to the damper hub 7 via a plurality of rivets. The second driven plate 17 is a plate-like annular member having a smaller inside diameter than the first driven plate 16, and an outer peripheral portion of the second driven plate 17 is fastened to the first driven plate 16 via a plurality of rivets, not shown.

The first driven plate 16 has: a plurality of (e.g., four in the present embodiment) spring accommodating windows 16w formed at intervals (regular intervals) in the circumferential direction and each having the shape of a circular arc; a plurality of (e.g., four in the present embodiment) spring support portions 16a formed at intervals (regular intervals) in the circumferential direction and each extending along the inner peripheral edge of a corresponding one of the spring accommodating windows 16w; a plurality of (e.g., four in the present embodiment) spring support portions 16b formed at intervals (regular intervals) in the circumferential direction and each extending along the outer peripheral edge of a corresponding one of the spring accommodating windows 16w and facing a corresponding one of the spring support portions 16a in the radial direction of the first driven plate 16; and a plurality of (e.g., four in the present embodiment) spring contact portions 16c. The plurality of spring contact portions 16c of the first driven plate 16 are formed so that one spring contact portion 16c is located between two spring accommodating windows 16w (spring support portions 16a, 16b) which are adjacent to each other in the circumferential direction.

The second driven plate 17 also has: a plurality of (e.g., four in the present embodiment) spring accommodating windows 17w formed at intervals (regular intervals) in the circumferential direction and each having the shape of a circular arc; a plurality of (e.g., four in the present embodiment) spring support portions 17a formed at intervals (regular intervals) in the circumferential direction and each extending along the inner peripheral edge of a corresponding one of the spring accommodating windows 17w; a plurality of (e.g., four in the present embodiment) spring support portions 17b formed at intervals (regular intervals) in the circumferential direction and each extending along the outer peripheral edge of a corresponding one of the spring accommodating windows 17w and facing a corresponding one of the spring support portions 17a in the radial direction of the second driven plate 17; and a plurality of (e.g., four in the present embodiment) spring contact portions 17c. The plurality of spring contact portions 17c of the second driven plate 17 are formed so that one spring contact portion 17c is located between two spring accommodating windows 17w (spring support portions 17a, 17b) which are adjacent to each other in the circumferential direction. In the present embodiment, as shown in FIG. 2, the drive member 11 is rotatably supported by the outer peripheral surface of the second driven plate 17 that is supported by the damper hub 7 via the first driven plate 16. The drive member 11 is thus aligned with respect to the damper hub 7.

In the damper device 10 mounted in position, one first spring SP1 and one second spring SP2 are disposed between two spring contact portions 11c of the drive member 11 adjacent to each other so that the first and second springs SP1, SP2 are alternately arranged in the circumferential direction of the damper device 10. Each spring contact portion 12c of the intermediate member 12 is located between the first and second springs SP1, SP2 that are paired (act in series) as they are disposed between two spring contact portions 11c adjacent to each other, and contacts the ends of these first and second springs SP1, SP2. Accordingly, in the damper device 10 mounted in position, one end of each first spring SP1 contacts a corresponding one of the spring contact portions 11c of the drive member 11, and the other end of each first spring SP1 contacts a corresponding one of the spring contact portions 12c of the intermediate member 12. In the damper device 10 mounted in position, one end of each second spring SP2 contacts a corresponding one of the spring contact portions 12c of the intermediate member 12, and the other end of each second spring SP2 contacts a corresponding one of the spring contact portions 11c of the drive member 11.

As can be seen from FIG. 2, each of the plurality of spring support portions 16a of the first driven plate 16 supports (guides) the turbine runner 5 sides of a corresponding pair of first and second springs SP1, SP2 from inside in the radial direction. Each of the plurality of spring support portions 16b supports (guides) the turbine runner 5 sides of a corresponding pair of first and second springs SP1, SP2 from outside in the radial direction. Moreover, as can be seen from FIG. 2, each of the plurality of spring support portions 17a of the second driven plate 17 supports (guides) the lockup piston 80 sides of a corresponding pair of first and second springs SP1, SP2 from inside in the radial direction. Each of the plurality of spring support portions 17b supports (guides) the lockup piston 80 sides of a corresponding pair of first and second springs SP1, SP2 from outside in the radial direction.

Like the spring contact portions 11c of the drive member 11, in the damper device 10 mounted in position, each of the spring contact portions 16c and the spring contact portions 17c of the driven member 15 is located between the first and second springs SP1, SP2 that are not paired (do not act in series), and contacts the ends of these first and second springs SP1, SP2. Accordingly, in the damper device 10 mounted in position, one end of each first spring SP1 also contacts a corresponding one of the spring contact portions 16c and a corresponding one of the spring contact portions 17c of the driven member 15, and the other end of each second spring SP2 also contacts a corresponding one of the spring contact portions 16c and a corresponding one of the spring contact portions 17c of the driven member 15. The driven member 15 is thus coupled to the drive member 11 via the plurality of first springs SP1, the intermediate member 12, and the plurality of second springs SP2, and the first and second springs SP1, SP2 that are paired are coupled in series between the drive member 11 and the driven member 15 via the spring contact portions 12c of the intermediate member 12. In the present embodiment, the distance between the axis of the starting device 1 and the damper device 10 and the axis of each first spring SP1 is the same as that between the axis of the starting device 1 etc. and the axis of each second spring SP2.

The damper device 10 of the present embodiment further includes a first stopper that restricts relative rotation between the intermediate member 12 and the driven member 15 and deflection of the second springs SP2, and a second stopper that restricts relative rotation between the drive member 11 and the driven member 15. The first stopper restricts relative rotation between the intermediate member 12 and the driven member 15 when torque that is transferred from the engine EG to the drive member 11 reaches predetermined torque (first threshold value) T1 smaller than torque T2 (second threshold value) corresponding to a maximum torsion angle of the damper device 10. The second stopper restricts relative rotation between the drive member 11 and the driven member 15 when torque that is transferred to the drive member 11 reaches the torque T2 corresponding to the maximum torsion angle. The damper device 10 thus has two-step (two-stage) damping characteristics. The first stopper may restrict relative rotation between the drive member 11 and the intermediate member 12 and deflection of the first springs SP1. The damper device 10 may include a stopper that restricts relative rotation between the drive member 11 and the intermediate member 12 and deflection of the first springs SP1, and a stopper that restricts relative rotation between the intermediate member 12 and the driven member 15 and deflection of the second springs SP2.

Figure 3:
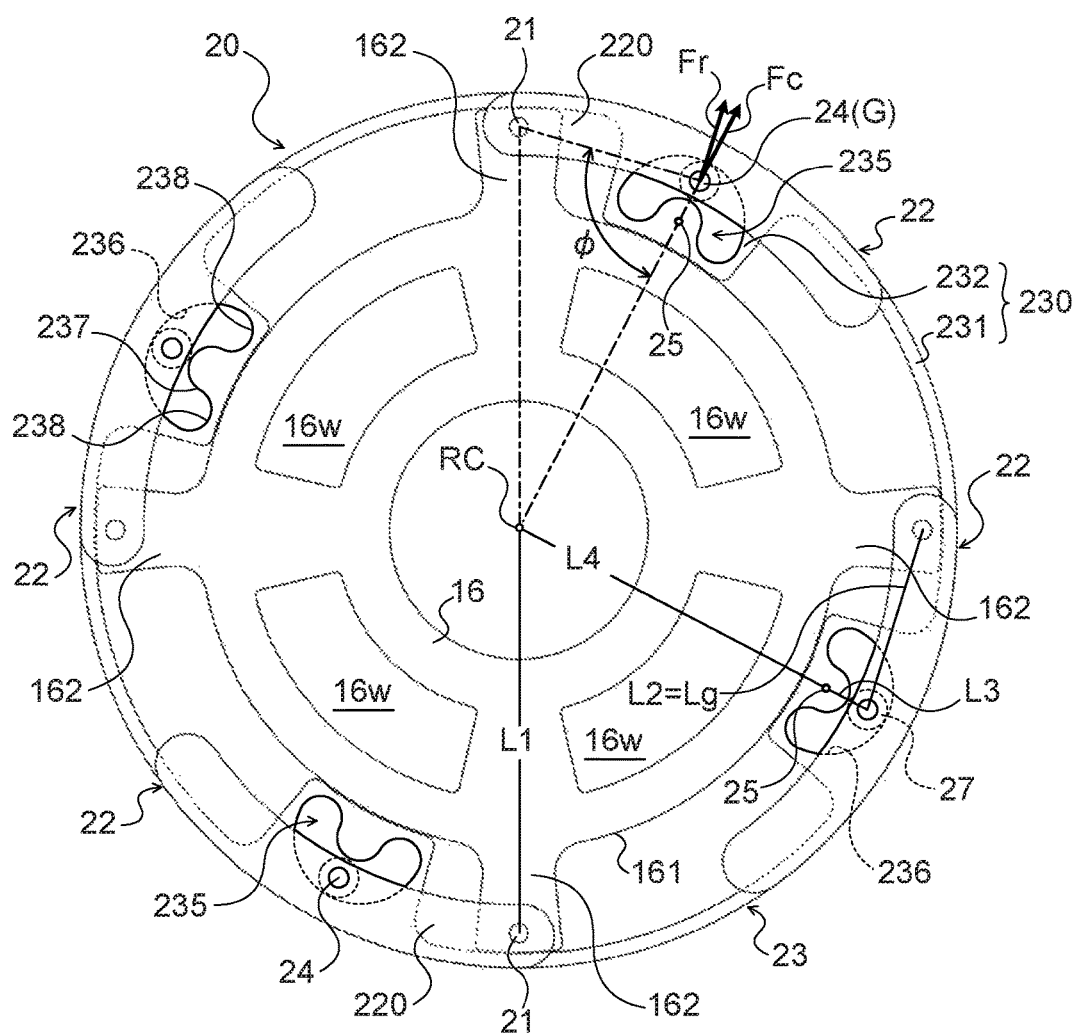
FIG. 3 is a front view of the vibration damping device of the present disclosure.
Figure 4:
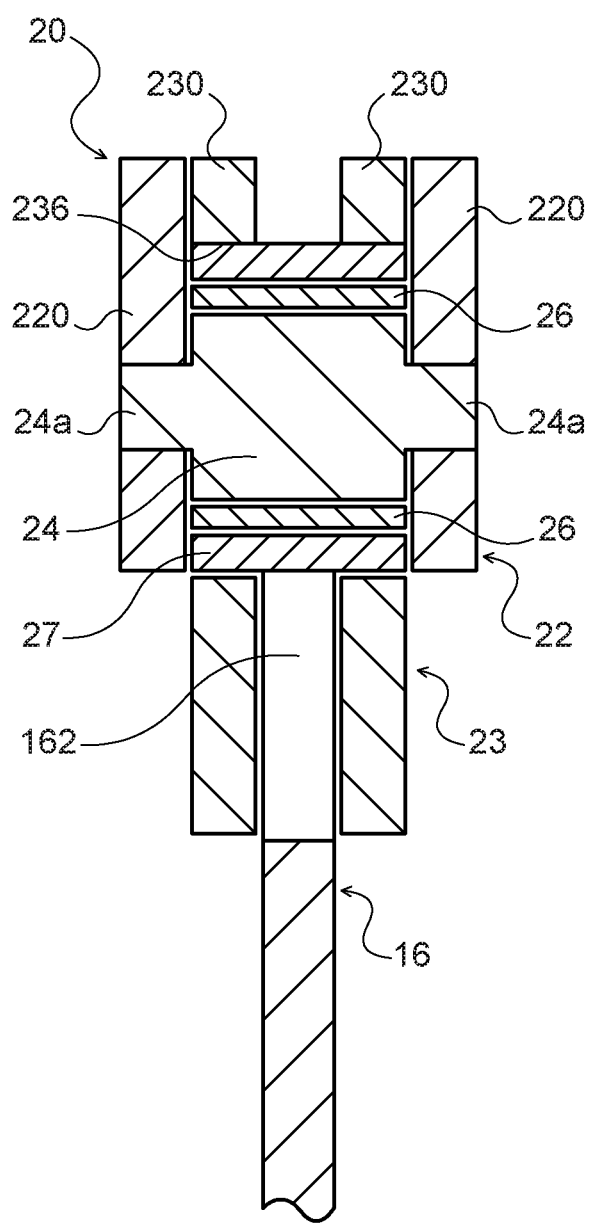
FIG. 4 is an enlarged sectional view of a main part of the vibration damping device of the present disclosure.

The vibration damping device 20 is coupled to the driven member 15 of the damper device 10 and is disposed in a hydraulic transmission chamber 9 filled with hydraulic oil. As shown in FIGS. 2 to 4, the vibration damping device 20 includes the first driven plate 16 serving as a support member (first link), a plurality of (e.g., four in the present embodiment) crank members 22 each rotatably coupled to the first driven plate 16 via a first coupling shaft 21 and serving as a restoring force generating member (second link), a single annular inertial mass body (third link) 23, and a plurality of (e.g., four in the present embodiment) second coupling shafts 24 each coupling a corresponding one of the crank members 22 and the inertial mass body 23 so that the crank member 22 and the inertial mass body 23 can rotate relative to each other.

As shown in FIG. 3, the first driven plate 16 has a plurality of (e.g., four in the present embodiment) protruding support portions 162 formed at intervals (regular intervals) in the circumferential direction so as to protrude radially outward from an outer peripheral surface 161 of the first driven plate 16. As shown in the figure, one end of each crank member 22 is rotatably coupled to a corresponding one of the protruding support portions 162 of the first driven plate 16 via the first coupling shaft 21 (see FIG. 3). As shown in FIG. 4, in the present embodiment, each crank member 22 has two plate members 220. Each plate member 220 is made of a metal sheet and has a circular arc planar shape. In the present embodiment, the radius of curvature of the outer peripheral edge of the plate member 220 is designed to be the same as that of the outer peripheral edge of the inertial mass body 23.

The two plate members 220 face each other in the axial direction of the damper device 10 via a corresponding one of the protruding support portions 162 and the inertial mass body 23 and are coupled to each other via the first coupling shaft 21. In the present embodiment, the first coupling shaft 21 is a rivet that is inserted through a coupling hole (circular hole) formed in the protruding support portion 162 of the first driven plate 16 and serving as a sliding bearing portion and coupling holes (circular holes) formed in respective plate members 220 and serving as sliding bearing portions and that is clinched at its both ends. The first driven plate 16 (driven member 15) and each crank member 22 thus form a turning pair. The first coupling shaft 21 may be inserted through the coupling holes formed in the protruding support portion 162 and one of the two plate members 220 and serving as sliding bearing portions and be supported by (fitted in or fixed to) the other plate member 220. A rolling bearing such as a ball bearing may be disposed either between the plate member 220 and the first coupling shaft 21 or between the protruding support portion 162 and the first coupling shaft 21, or both between the plate member 220 and the first coupling shaft 21 and between the protruding support portion 162 and the first coupling shaft 21.

The inertial mass body 23 includes two annular members 230 made of a metal sheet, and the weight of the inertial mass body 23 (two annular members 230) is designed to be sufficiently heavier than that of a single crank member 22. As shown in FIGS. 3 and 4, the annular member 230 has a short cylindrical (ring-shaped) body 231 and a plurality of (e.g., four in the present embodiment) protruding portions 232 formed at intervals (regular intervals) in the circumferential direction so as to protrude radially inward from the inner peripheral surface of the body 231. The two annular members 230 are coupled via a fixing member, not shown, such that the protruding portions 232 face each other in the axial direction of the annular members 230.

Each protruding portion 232 has a guide portion 235 that guides the second coupling shaft 24 coupling the crank member 22 and the inertial mass body 23. The guide portion 235 is a circular arc-shaped opening and includes a concave guide surface 236, a convex support surface 237 located closer to the inner periphery of the annular member (first driven plate 16) (closer to the center of the annular member 230) than the guide surface 236 is and facing the guide surface 236, and two stopper surfaces 238 located on both sides of the guide surface 236 and the support surface 237 and continuous with the guide surface 236 and the support surface 237. The guide surface 236 is a concave cylindrical surface with a constant radius of curvature. The support surface 237 is a circular arc-shaped convex surface, and the stopper surfaces 238 are circular arc-shaped concave surfaces. As shown in FIG. 3, the guide portion 235 (the guide surface 236, the support surface 237, and the stopper surfaces 238) is symmetric with respect to a straight line passing through the center of curvature of the guide surface 236 and the center of the annular member 230 (the center of rotation RC of the first driven plate 16). In the vibration damping device 20, a straight line passing through the center of curvature of the guide surface 236 and perpendicular to the protruding portion 232 (annular member 230) is defined as an imaginary axis (third coupling shaft) 25 whose position relative to the two annular members 230, namely the inertial mass body 23, does not change (which does not move relative to the inertial mass body 23).

The second coupling shaft 24 is in the shape of a solid (or hollow) round bar and has two projecting portions 24a that are in the shape of, e.g., a round bar and project axially outward from its both ends. As shown in FIG. 4, the two projecting portions 24a of the second coupling shaft 24 are fitted (fixed) in coupling holes (circular holes) formed in the plate members 220 of the crank member 22. In the present embodiment, the coupling hole of the plate member 220 in which the projecting portion 24a is fitted is formed in each plate member 220 so that the central axis of the coupling hole extends coaxially with a straight line passing through the center of gravity G of the crank member 22 (near the central part in the longitudinal direction of the plate member 220). The length from the center of the first coupling shaft 21 coupling the first driven plate 16 (protruding support portion 162) and the crank member 22 to the center of gravity G of the crank member 22 is thus the same as the axis-to-axis distance (center-to-center distance) between the first coupling shaft 21 and the second coupling shaft 24 coupling the crank member 22 and the inertial mass body 23. The other end of the crank member 22 (plate members 220) is located on the opposite side of the second coupling shaft 24 from the first coupling shaft 21. Each projecting portion 24a of the second coupling shaft 24 may be inserted through a coupling hole (circular hole) formed in the plate member 220 of the crank member 22 and serving as a sliding bearing portion. That is, the second coupling shaft 24 may be rotatably supported from both sides by the two plate members 220, namely the crank member 22. A rolling bearing such as a ball bearing may be disposed between each plate member 220 and each projecting portion 24a of the second coupling shaft 24.

As shown in FIG. 4, the second coupling shaft 24 rotatably supports a cylindrical outer ring 27 via a plurality of rollers (rolling elements) 26. The outside diameter of the outer ring 27 is designed to be slightly smaller than the interval between the guide surface 236 and the support surface 237 of the guide portion 235. The second coupling shaft 24 and the outer ring 27 are disposed in corresponding ones of the guide portions 235 of the inertial mass body 23 so as to be supported by the crank member 22 and so that the outer ring 27 rolls on the guide surfaces 236. The inertial mass body 23 is thus disposed coaxially with the center of rotation RC of the first driven plate 16 so that the inertial mass body 23 can rotate about the center of rotation RC. Since the plurality of rollers 26, the outer ring 27, and the second coupling shaft 24 form a rolling bearing, the crank member 22 and the inertial mass body 23 are allowed to rotate relative to each other. Each crank member 22 and the inertial mass body 23 thus form a turning pair. Instead of the plurality of rollers 26, a plurality of balls may be disposed between the second coupling shaft 24 and the outer ring 27.

As described above, in the vibration damping device 20, the first driven plate 16 (driven member 15) and each crank member 22 forms a turning pair, and each crank member 22 and the second coupling shaft 24 guided by the guide portions 235 of the inertial mass body 23 forms a turning pair. The inertial mass body 23 is rotatably disposed about the center of rotation RC of the first driven plate 16. Accordingly, when the first driven plate 16 rotates in one direction, each second coupling shaft 24 is guided by the guide portions 235 of the inertial mass body 23 and moves with motion of the second link to swing (reciprocating rotary motion) about the first coupling shaft 21 while maintaining a constant axis-to-axis distance to the first coupling shaft 21 and to swing (reciprocating rotary motion) about the imaginary axis 25 while maintaining a constant axis-to-axis distance to the imaginary axis 25. That is, each crank member 22 swings about the first coupling shaft 21 with the movement of the second coupling shaft 24, and the imaginary axis 25 and the inertial mass body 23 swing about the moving second coupling shaft 24 and swing (reciprocating rotary motion) about the center of rotation RC of the first driven plate 16. The first driven plate 16, the crank member 22, the inertial mass body 23, the first and second coupling shafts 21, 24, and the guide portions 235 thus substantially form a four-bar linkage mechanism in which the first driven plate 16 serves as a fixed link.

Moreover, in the present embodiment, the first driven plate 16, the crank members 22, the inertial mass body 23, the second coupling shafts 24, and the guide portions 235 of the inertial mass body 23 are configured to satisfy the relationship L1+L2>L3+L4, where "L1" represents the axis-to-axis distance between the center of rotation RC of the first driven plate 16 and the first coupling shaft 21, "L2" represents the axis-to-axis distance between the first coupling shaft 21 and the second coupling shaft 24, "L3" represents the axis-to-axis distance between the second coupling shaft 24 and the imaginary axis 25, and "L4" represents the axis-to-axis distance the imaginary axis 25 and the center of rotation RC (see FIG. 2). In the present embodiment, the axis-to-axis distance L3 between the second coupling shaft 24 and the imaginary axis 25 (the radius of curvature of the guide surface 236 minus the radius of the outer ring 27) is designed to be shorter than the axis-to-axis distances L1, L2, and L4 and is set as short as possible within the range that does not affect the operation of each crank member 22 and the inertial mass body 23. Moreover, in the present embodiment, the first driven plate 16 (protruding support portion 162) serving as a first link is configured so that the axis-to-axis distance L1 between the center of rotation RC and the first coupling shaft 21 is longer than the axis-to-axis distances L2, L3, and L4.

Accordingly, the vibration damping device 20 of the present embodiment satisfies the relationship L1>L4>L2>L3, and the first driven plate 16, the crank member 22, the inertial mass body 23, the first and second coupling shafts 21, 24, and the guide portions 235 substantially form a double lever mechanism in which the first driven plate 16 facing a line segment (imaginary link) connecting the second coupling shaft 24 and the imaginary axis 25 serves as a fixed link. The vibration damping device 20 of the present embodiment further satisfies the relationship Lg=L2, where "Lg" represents the length from the center of the first coupling shaft 21 to the center of gravity G of the crank member 22.

An "equilibrium (balanced) state" of the vibration damping device 20 is the state where the resultant force of the sum of centrifugal forces acting on the components of the vibration damping device 20 and the forces acting on the centers of the first and second coupling shafts 21, 24 of the vibration damping device 20 and the center of rotation RC is zero. As shown in FIG. 2, when the vibration damping device 20 is in the equilibrium state, the center of the second coupling shaft 24, the center of the imaginary axis 25, and the center of rotation RC of the first driven plate 16 are located on a straight line. The vibration damping device 20 of the present embodiment is also configured to satisfy 60°≤φ≤120°, more preferably 70°≤φ≤90°, where "φ" represents the angle formed by the direction from the center of the first coupling shaft 21 toward the center of the second coupling shaft 24 and the direction from the center of the second coupling shaft 24 toward the center of rotation RC when the vibration damping device 20 is in the equilibrium state where the center of the second coupling shaft 24, the center of the imaginary axis 25, and the center of rotation RC of the first driven plate 16 are located on a straight line.

As can be seen from FIG. 1, in the starting device 1 including the damper device 10 and the vibration damping device 20, when the lockup coupling has been released by the lockup clutch 8, torque (power) from the engine EG as a motor is transferred to the input shaft IS of the transmission TM through a path formed by the front cover 3, the pump impeller 4, the turbine runner 5, and the damper hub 7. As can be seen from FIG. 1, when the lockup coupling is being performed by the lockup clutch 8, torque (power) from the engine is transferred to the input shaft IS of the transmission TM through a path formed by the front cover 3, the lockup clutch 8, the drive member 11, the first springs SP1, the intermediate member 12, the second springs SP2, the driven member 15, and the damper hub 7.

When the drive member 11 coupled to the front cover 3 by the lockup clutch 8 is rotated with rotation of the engine EG while the lockup coupling is being performed by the lockup clutch 8, the first and second springs SP1, SP2 act in series via the intermediate member 12 between the drive member 11 and the driven member 15 until torque that is transferred to the drive member 11 reaches torque T1. Torque transferred from the engine EG to the front cover 3 is thus transferred to the input shaft IS of the transmission TM, and fluctuation in torque from the engine EG is damped (absorbed) by the first and second springs SP1, SP2 of the damper device 10. When the torque that is transferred to the drive member 11 becomes equal to or larger than the torque T1, fluctuation in torque from the engine EG is damped (absorbed) by the first springs SP1 of the damper device 10 until this torque reaches torque T2.

Figure 5A:
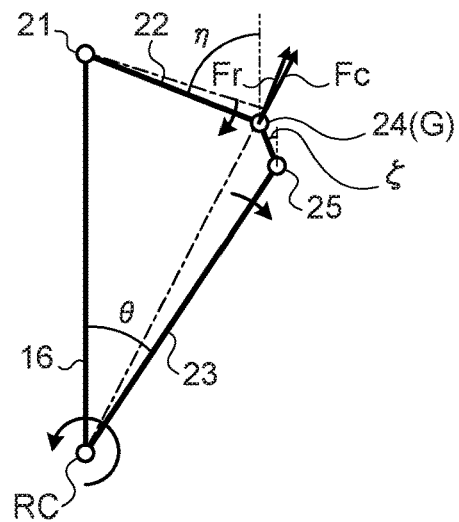
FIG. 5A is a schematic view illustrating operation of the vibration damping device of the present disclosure.
Figure 5B:
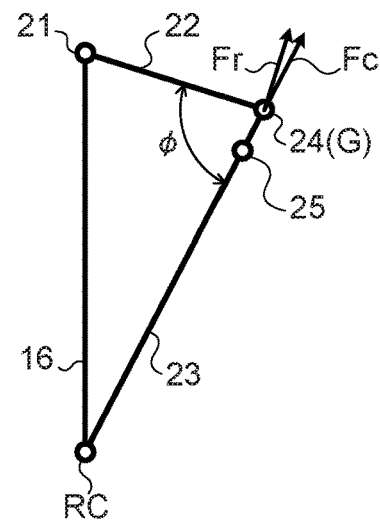
FIG. 5B is a schematic view illustrating operation of the vibration damping device of the present disclosure.
Figure 5C:
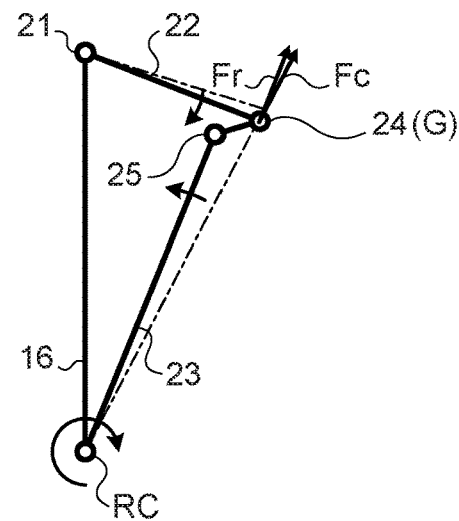
FIG. 5C is a schematic view illustrating operation of the vibration damping device of the present disclosure.

Moreover, in the starting device 1, when the damper device 10 coupled to the front cover 3 by the lockup clutch 8 by the lockup coupling rotates with the front cover 3, the first driven plate 16 (driven member 15) of the damper device 10 also rotates in the same direction as the front cover 3 about the axis of the starting device 1. With the rotation of the first driven plate 16, each crank member 22 and the inertial mass body 23 of the vibration damping device 20 swing with respect to the first driven plate 16 as shown in FIGS. 5A, 5B, and 5C. Vibration in opposite phase from vibration transmitted from the engine EG to the drive member 11 is thus applied from the swinging inertial mass body 23 to the first driven plate 16 via each guide portion 235, each second coupling shaft 24, and each crank member 22, whereby vibration of the first driven plate 16 can be dampened. That is, the vibration damping device 20 is configured to have an order according to the order of vibration that is transmitted from the engine EG to the first driven plate 16 (vibration order: 1.5th order in the case where the engine EG is, e.g., a three-cylinder engine, and second order in the case where engine EG is, e.g., a four-cylinder engine). The vibration damping device 20 damps vibration that is transmitted from the engine EG to the first driven plate 16, regardless of the rotational speed of the engine EG (first driven plate 16). Vibration can thus be very satisfactorily damped by both the damper device 10 and the vibration damping device 20 while an increase in weight of the damper device 10 is retained.

In the vibration damping device 20, a four-bar linkage mechanism can be configured without using a link coupled to both the crank member 22 and the inertial mass body 23, namely a connecting rod of a common four-bar linkage mechanism. In the vibration damping device 20, it is therefore not necessary to increase the thickness and weight of the connecting rod so that the connecting rod has sufficient strength and durability. An increase in overall weight and size of the device is thus satisfactorily restrained. Moreover, in the vibration damping device 20 including no connecting rod, a restoring force acting on the crank member 22 is restrained from being reduced due to the center of gravity G of the crank member 22 being moved toward the center of rotation RC by an increase in weight (moment of inertia) of the connecting rod. Satisfactory vibration damping capability is thus achieved.

Since no bearing such sliding bearing or rolling bearing is required for the imaginary axis 25 of the vibration damping device 20, the axis-to-axis distance $L_3$ between the second coupling shaft 24 and the imaginary axis 25, namely the length of a connecting rod of a common four-bar linkage mechanism, can be set with greater flexibility, whereby the axis-to-axis distance L3 can be easily reduced. The vibration damping capability of the vibration damping device 20 can thus be easily improved by adjusting the axis-to-axis distance L3. Moreover, since the link (connecting rod) connected to both the crank member 22 and the inertial mass body 23 is not required, a component of a centrifugal force Fc acting on the crank member 22 will not be used to return the link coupled to both the crank member 22 and the inertial mass body 23 to its position in the equilibrium state. The vibration damping capability of the vibration damping device 20 is thus improved while an increase in weight of the crank member 22 is restrained. As a result, in the vibration damping device 20, the vibration damping capability is further improved while restraining an increase in overall weight and size of the device.

Next, a procedure for designing the vibration damping device 20 will be described.

In the case where a connecting rod and an inertial mass body are omitted from such a vibration damping device 20 as described above, this vibration damping device can be said to correspond to a centrifugal pendulum vibration absorbing device. In centrifugal pendulum vibration absorbing devices, however, the deflection angle of a pendulum mass body increases with an increase in amplitude of vibration of input torque that is transferred to a support member of the pendulum mass body. As the deflection angle increases, a restoring force that tries to return the pendulum mass body to the equilibrium state (balanced position) decreases accordingly. Therefore, the amount of decrease in restoring force, namely in equivalent stiffness of the centrifugal pendulum vibration absorbing device, with respect to the amount of change in moment of inertia of the pendulum mass body, namely in equivalent mass of the centrifugal pendulum vibration absorbing device, increases, and an effective order, which is an order of vibration that can be most satisfactorily damped by the centrifugal pendulum vibration absorbing device, decreases as the deflection angle of the pendulum mass body increases. In the centrifugal pendulum vibration absorbing devices, the larger the amount of decrease in effective order (the difference from the excitation order) is, the more the vibration damping capability is degraded. The centrifugal pendulum vibration absorbing devices are therefore typically designed to minimize the decrease in effective order which occurs as the deflection angle increases.

On the other hand, in the vibration damping device 20 described above, when the amplitude $\lambda$ of vibration of torque that is transferred from the drive member 11 to the driven member 15 (hereinafter referred to as the "input torque") increases and the deflection angle of the inertial mass body 23 increases accordingly, deviation is produced between the order of vibration that is supposed to be damped by the vibration damping device 20, which is the excitation order $q_{tag}$ of the engine EG, and the effective order $q_{eff}$, which is the order of vibration that is most satisfactorily damped by the vibration damping device 20. That is, in the vibration damping device 20, as the deflection angle of the inertial mass body 23, namely the amplitude $\lambda$ of vibration of input torque, increases, the effective order $q_{eff}$ may become smaller than the excitation order $q_{tag}$ of the engine EG or larger than the excitation order $q_{tag}$ of the engine EG depending on the specifications of the vibration damping device.

The inventors therefore first carried out simulations to find such combinations of the axis-to-axis distances L2, L3, L4 and the length Lg (length from the center of the first coupling shaft 21 to the center of gravity G of the crank member 22) that do not vary the effective order $q_{eff}$ even if the amplitude $\lambda$ of vibration of input torque varies. The mass m of the crank members 22, the moment of inertia (inertia) J of the inertial mass body 23, the number of cylinders n of the engine EG, and the axis-to-axis distance L1 that depends on the requirements for mounting the vibration damping device 20, etc. were the same in the simulations. A plurality of models of the vibration damping device 20 with various axis-to-axis distances L2, L3, L4 and various lengths Lg were used in the simulations. The initial state was the state where the inertial mass body 23 had been rotated by a certain initial angle (angle corresponding to the deflection angle of the inertial mass body 23 about the center of rotation RC) about the center of rotation RC from its position in the equilibrium state. In the simulations, torque containing no vibration component was applied to the first driven plate 16 at every plurality of initial angles to rotate the first driven plate 16 at a constant rotational speed (e.g., 1000 rpm) so as to cause the inertial mass body 23 etc. to swing at a frequency corresponding to the initial angle. All of the plurality of models used in the simulations were prepared to damp vibration of the excitation order $q_{tag}$=1.5 in a three-cylinder engine. A centrifugal oil pressure acting on the crank members 22 in the hydraulic transmission chamber 9 and the influence of friction between members were ignored in the simulations.

The results of the simulations show that, in the case where the vibration damping device 20 satisfies the relationship as given by the following expression (1), the effective order $q_{eff}$ is kept approximately constant even if the amplitude $\lambda$ of vibration of input torque varies. In the expression (1), "$\alpha$," "$\beta$," and "$\gamma$" are constants determined by the simulations. The results of analysis carried out by the inventors show that, in the case where the vibration damping device 20 satisfies the relationship as given by the following expression (2), the effective order $q_{eff}$ increases as the amplitude $\lambda$ of vibration of input torque increases, and in the case where the vibration damping device 20 satisfies the relationship as given by the following expression (3), the effective order $q_{eff}$ decreases as the amplitude $\lambda$ of vibration of input torque increases. The results of the analysis also show that, in the vibration damping device 20 that satisfies any one of the expressions (1), (2), and (3), the value to which the effective order $q_{eff}$ converges (hereinafter referred to as the "reference order $q_{ref}$") as the amplitude $\lambda$ of vibration of input torque decreases is varied by changing the mass m of the crank members 22 and the moment of inertia J of the inertial mass body 23. In this case, the smaller the mass m of the crank members 22 is, the larger the reference order $q_{ref}$ is, and the larger the moment of inertia J of the inertial mass body 23 is, the larger the reference order $q_{ref}$ is.

$$L4/(L3+L4)=\alpha(Lg/L2)+\beta \cdot n+\gamma \quad (1)$$

$$L4/(L3+L4)>\alpha(Lg/L2)+\beta \cdot n+\gamma \quad (2)$$

$$L4/(L3+L4)<\alpha(Lg/L2)+\beta \cdot n+\gamma \quad (3)$$

The inventors also considered the relationship between the reference order $q_{ref}$ and the vibration damping capability of the vibration damping device 20 based on the results of the simulations and analysis described above. For a plurality of models of the vibration damping device 20 prepared to have the same rate $\rho$ of the amount of deviation of the effective order $q_{eff}$ from the excitation order $q_{tag}$ to the excitation order $q_{tag}$ and have different reference orders $q_{ref}$ from each other, the inventors evaluated the relationship between the rotational speed Ne of the engine EG (a three-cylinder engine in this example) and the torque fluctuation $T_{Fluc}$ of a final object whose vibration is to be damped (the drive shaft DS in this example) by numerical analysis using LMS Imagine.Lab Amesim (registered trademark) from Simens AG. The amount of deviation of the effective order $q_{eff}$ from the excitation order $q_{tag}$ is a value obtained by subtracting the excitation order $q_{tag}$ from the effective order $q_{eff}$ at the time the amplitude $\lambda$ of vibration of input torque reaches its maximum value and the deflection angle of the inertial mass body 23 reaches its maximum value.

LMS Imagine.Lab Amesim used for the analysis derives equations for each rotary element included in an input dynamic model and solves a simultaneous equation consisting of the derived equation group based on design parameters of the dynamic model which are input separately, thereby calculating for each rotary element of the dynamic model a response (angle, namely rotational displacement, per unit time) to an external force and calculating torque to be transferred from the calculated response and stiffnesses in front of and behind the rotary element. The dynamic model used for the analysis is a dynamic model simulating the vehicle structure (see FIG. 1) from the engine EG to wheels W which includes the vibration damping device 20 and the final object whose vibration is to be damped (the drive shaft DS in this example). This dynamic model is a multi-degree-of-freedom dynamic model produced in view of non-linearity of objects whose vibration is to be damped and the vibration damping device 20. In the analysis, the moment of inertia $J_1$ of the driven member 15, the moment of inertia $J_2$ of the inertial mass body 23, the axis-to-axis distances L3, L4, and the mass m of all the crank members 22 out of the design parameters of the dynamic model were varied as appropriate in view of mountability of the vibration damping device 20 on the starting device 1 (vehicle) etc. so that the plurality of models of the vibration damping device 20 had different reference orders $q_{ref}$ from each other. That is, in the analysis, the design parameters of the dynamic model other than the moments of inertia $J_1$, $J_2$ and the axis-to-axis distances L3, L4, and the mass m had fixed values.

Figure 6:
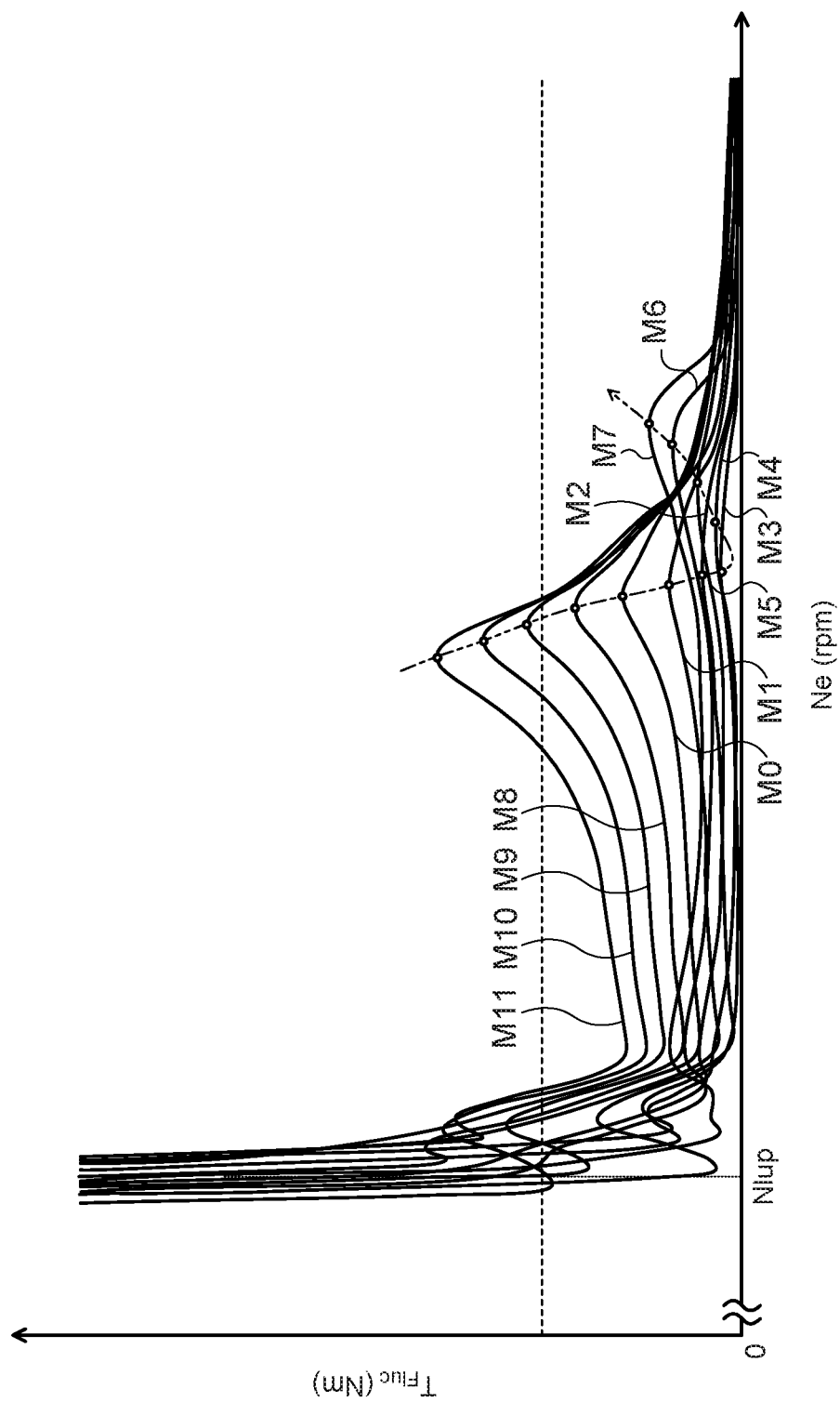
FIG. 6 is a graph illustrating the relationship between the engine speed and the torque fluctuation $T_{Fluc}$ in an output element of a damper device of the present disclosure.

FIG. 6 shows the analysis results of the relationship between the rotational speed Ne and the torque fluctuation $T_{Fluc}$ of the drive shaft DS in a plurality of models M0 to M11 of the vibration damping device 20 having different reference orders $q_{ref}$ from each other. This figure shows the analysis results of the torque fluctuation $T_{Fluc}$ (vibration level) of the drive shaft DS with torque being transferred from the engine EG to the driven member 15 by the lockup coupling.

The model M0 in FIG. 6 is a model of the vibration damping device 20 for which the moment of inertia $J_1$ of the driven member 15, the moment of inertia $J_2$ of the inertial mass body 23, the axis-to-axis distances L3, L4, and the mass m of all the crank members 22 were determined so that the reference order $q_{ref}$ is the same as the excitation order $q_{tag}$ (=1.5). The models M1 to M7 are models for which the moments of inertia $J_1$, $J_2$, the axis-to-axis distances L3, L4, and the mass m were determined so that the reference order $q_{ref}$ is increased in increments of 0.005. That is, the reference order $q_{ref}$ of the model M1 is $q_{ref}$=1.505, the reference order $q_{ref}$ of the model M2 is $q_{ref}$=1.510, the reference order $q_{ref}$ of the model M3 is $q_{ref}$=1.515, the reference order $q_{ref}$ of the model M4 is $q_{ref}$=1.520, the reference order $q_{ref}$ of the model M5 is $q_{ref}$=1.525, the reference order $q_{ref}$ of the model M6 is $q_{ref}$=1.530, and the reference order $q_{ref}$ of the model M7 is $q_{ref}$=1.535. The models M8 to M11 are models for which the moments of inertia $J_1$, $J_2$, the axis-to-axis distances L3, L4, and the mass m were determined so that the reference order $q_{ref}$ is decreased in decrements of 0.005. That is, the reference order $q_{ref}$ of the model M8 is $q_{ref}$=1.495, the reference order $q_{ref}$ of the model M9 is $q_{ref}$=1.490, the reference order $q_{ref}$ of the model M10 is $q_{ref}$=1.485, the reference order $q_{ref}$ of the model M11 is $q_{ref}$=1.480.

The moments of inertia $J_1$, $J_2$, the axis-to-axis distances L3, L4, and the mass m of each model M0 to M11 were determined according to the above expression (2) so that the effective order $q_{eff}$ gradually increases as the amplitude $\lambda$ of vibration of input torque that is transferred from the engine EG to the driven member 15 increases (e.g., so that the rate ρ is a fixed value around 10%). The reference order $q_{ref}$ was varied among the models M0 to M11 by using the same moment of inertia $J_1$ of the driven member 15, the same axis-to-axis distances L3, L4, and the same mass m of the crank members 22 in all the models M0 to M11 and varying the moment of inertia $J_2$ of the inertial mass body 23 among the models M0 to M11. As described above, however, the reference order $q_{ref}$ may be adjusted by using the same moments of inertia $J_1$, $J_2$ and the same axis-to-axis distances L3, L4 and varying the mass m of the crank members 22.

As can be seen from FIG. 6, in the models M9, M10, and M11 whose reference order $q_{ref}$ is smaller than the excitation order $q_{tag}$, the torque fluctuation $T_{Fluc}$ of the drive shaft DS at around a lockup rotational speed Nlup of the lockup clutch Bis larger than an allowable value shown by dashed line in the figure, and a peak value (see circles in the figure) of the torque fluctuation $T_{Fluc}$ in a predetermined rotational speed range (e.g., 1000 to 2000 rpm) in a lockup region is also larger than the allowable value. In the model M8 whose reference order $q_{ref}$ is slightly smaller than the excitation order $q_{tag}$, a peak value of the torque fluctuation $T_{Fluc}$ in the predetermined rotational speed range in the lockup region is smaller than the allowable value, but the torque fluctuation $T_{Fluc}$ of the drive shaft DS at around the lockup rotational speed Nlup is larger than the allowable value. On the other hand, in the models M1 to M7 whose reference order $q_{ref}$ is smaller than the excitation order $q_{tag}$, the torque fluctuation $T_{Fluc}$ of the drive shaft DS at around the lockup rotational speed Nlup is sufficiently small and is smaller than both the allowable value and the torque fluctuation $T_{Fluc}$ of the drive shaft DS at around the lockup rotational speed Nlup in the model M0 in which the rate ρ is 0%, and a peak value of the torque fluctuation $T_{Fluc}$ in the predetermined rotational speed range in the lockup region is also sufficiently small.

It should be understood from the analysis results that, in the vibration damping device 20 including the crank members 22 and the inertial mass body 23 that swings with motion of the crank members 22, the vibration damping capability can be more improved by making the reference order $q_{ref}$, namely the value to which the effective order $q_{eff}$ converges as the amplitude $\lambda$ of vibration of input torque decreases, larger than the excitation order $q_{tag}$ of the engine EG than by making the reference order $q_{ref}$ the same as the excitation order $q_{tag}$. In view of this, the vibration damping device 20 of the present embodiment is designed so that the reference order $q_{ref}$ is larger than the excitation order $q_{tag}$ of the engine EG.

Figure 7:
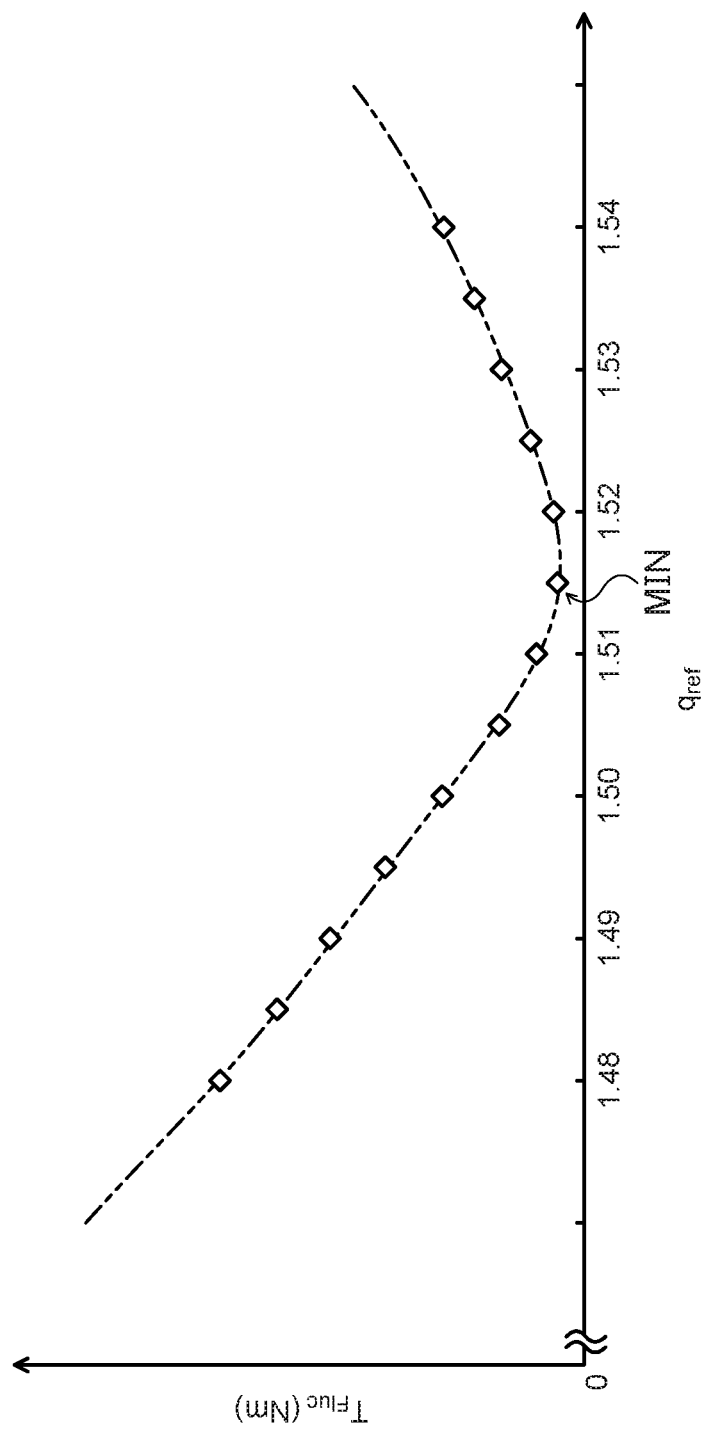
FIG. 7 is a graph illustrating the relationship between the reference order $q_{ref}$ and the torque fluctuation $T_{Fluc}$ in the output element of the damper device of the present disclosure.

As shown in FIG. 7 (and by long dashed double-short dashed line in FIG. 6), when the model M0 whose the reference order $q_{ref}$ is the same as the excitation order $q_{tag}$ (=1.50) is used as a reference point, the peak value of the torque fluctuation $T_{Fluc}$ in the predetermined rotational speed range in the lockup region increases as the reference order $q_{tag}$ decreases. As shown in FIG. 7 (and by long dashed double-short dashed line in FIG. 6), for the reference orders $q_{ref}$ larger than the excitation order $q_{tag}$, when the model M0 is used as a reference point, the peak value of the torque fluctuation $T_{Fluc}$ in the lockup region first decreases with an increase in reference order $q_{ref}$, but then starts to increase at a minimal value MIN. In view of this tendency, the vibration damping device is designed to satisfy $1.00 \times q_{tag} < q_{ref} \leq 1.03 \times q_{tag}$, more preferably $1.01 \times q_{tag} \leq q_{ref} \leq 1.02 \times q_{tag}$. The peak value of the torque fluctuation $T_{Fluc}$ in the predetermined rotational speed range in the lockup region is thus made closer to a value (target value or target range) around the minimal value MIN, whereby the vibration damping capability of the vibration damping device 20 including the crank members 22 and the inertial mass body 23 that swings with motion of the crank members 22 can be very satisfactorily improved.

Figure 8:
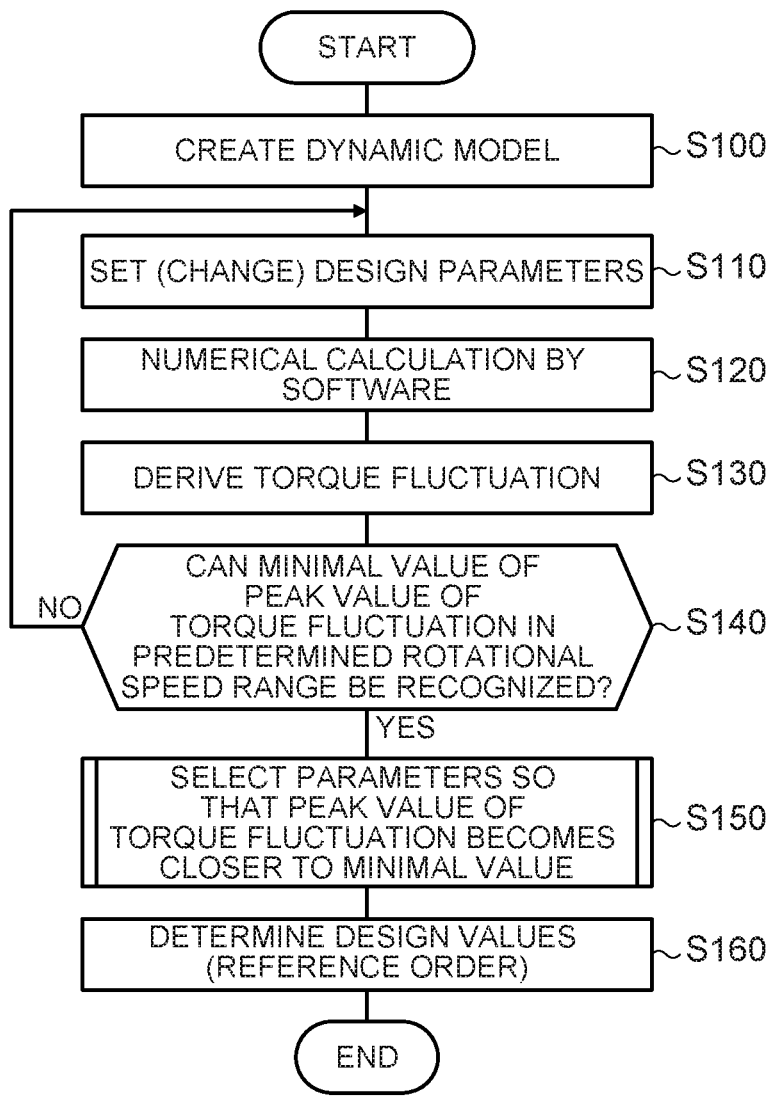
FIG. 8 is a flowchart showing an example of a procedure for designing the vibration damping device of the present disclosure.

In order to make the reference order $q_{ref}$ larger than the excitation order $q_{tag}$ and to make the peak value of the torque fluctuation $T_{Fluc}$ in the predetermined rotational speed range closer to the minimal value MIN, the vibration damping device 20 is designed by a procedure as shown in FIG. 8. That is, when designing the vibration damping device 20, a dynamic model as described above, namely, a dynamic model simulating the vehicle structure from the engine EG to the wheels W which includes the vibration damping device 20 and the final object whose vibration is to be damped, is first created (step S100). Next, for example, the moments of inertia $J_1$, $J_2$, the axis-to-axis distances L3, L4, and the mass m are set as design parameters that make the reference order $q_{ref}$ the same as or slightly larger than the excitation order $q_{tag}$ (step S110). For the design parameters set in step S110, numerical calculation (calculation of the response described above) is performed by software such as LMS Imagine.Lab Amesim (step S120) and torque fluctuation $T_{Fluc}$ in the drive shaft DS whose vibration is to be damped is derived (S130).

After the processing of step S130, it is determined whether a minimal value MIN of a peak value of the torque fluctuation $T_{Fluc}$ in a predetermined rotational speed range (e.g., 1000 to 2000 rpm) can be recognized or not, namely whether the peak value of the torque fluctuation $T_{Fluc}$ has switched from decreasing to increasing or not (step S140). If it is determined in step S140 that the minimal value MIN of the peak value of the torque fluctuation $T_{Fluc}$ cannot be recognized, the routine returns to step S110, where the moments of inertia $J_1$, $J_2$, the axis-to-axis distances L3, L4, and the mass m as design parameters are reset (changed) so that the reference order $q_{ref}$ becomes larger than the reference order $q_{ref}$ determined by the design parameters set in the previous step S110. At this time, as described above, only the moment of inertia $J_2$ or the mass m may be changed in order to increase the reference order $q_{ref}$. After the design parameters are reset in this manner, the processing of the above steps S120 to S140 is performed again. That is, the design parameters are set (changed) in step S110 so that the reference order $q_{ref}$ increases, and the processing of steps S120 and S130 is repeated until it is determined in step S140 that the minimal value MIN of the peak value of the torque fluctuation $T_{Fluc}$ can be recognized.

If it is determined in step S140 that the minimal value MIN of the peak value of the torque fluctuation $T_{Fluc}$ can be recognized, the design parameters that make the peak value of the torque fluctuation $T_{Fluc}$ equal to a target value, namely the moments of inertia $J_1$, $J_2$, the axis-to-axis distances L3, L4, and the mass m as design parameters that make the peak value closer to the minimal value MIN or make the peak value equal to the minimal value MIN, are selected (step S150). For example, in step S150, the design parameters (e.g., the moment of inertia $J_2$ or the mass m) are changed so that the reference order $q_{ref}$ becomes larger than the reference order $q_{ref}$ determined by the design parameters immediately before the peak value of the torque fluctuation $T_{Fluc}$ starts to increase, and the torque fluctuation $T_{Fluc}$ is derived in a manner similar to that of steps S120 and S130 to find the design parameters that make the peak value of the torque fluctuation $T_{Fluc}$ in the predetermined rotational speed range equal to the minimal value MIN or to a value close to the minimal value MIN.

The values of the design parameters thus selected, namely the moments of inertia $J_1$, $J_2$, the axis-to-axis distances L3, L4, and the mass m, are determined as design values (step S160). The design for making the reference order $q_{ref}$ larger than the excitation order $q_{tag}$ and making the peak value of the torque fluctuation $T_{Fluc}$ closer to the minimal value MIN is thus completed. The reference order $q_{ref}$ of the vibration damping device 20 is determined according to the values of the moments of inertia $J_1$, $J_2$, the axis-to-axis distances L3, L4, and the mass m determined as design values.

In step S110 of FIG. 8, the design parameters may be automatically set (changed) by software, the design parameters that have been set separately may be input to software, or a plurality of sets of design parameters ($J_1$, $J_2$, L3, L4, m) determined in advance so that the reference order $q_{ref}$ increases may be sequentially set as parameters for numerical analysis. In step S150 of FIG. 8, the design parameters that makes the peak value of the torque fluctuation $T_{Fluc}$ closer to the minimal value MIN may be determined from the design parameters immediately before the peak value of the torque fluctuation $T_{Fluc}$ starts to increase and the design parameters at the time the peak value is starting to increase, in view of mountability of the vibration damping device 20 on the starting device 1 (vehicle) etc. Alternatively, a plurality of design parameters that cause the peak value of the torque fluctuation $T_{Fluc}$ in the predetermined rotational speed range which is derived in step S130 of FIG. 8 to be included in a predetermined target value (allowable range, near the minimal value MIN in FIG. 7) may be extracted and a parameter that minimizes the peak value of the torque fluctuation $T_{Fluc}$ may be selected as a design value from the plurality of design parameters. In any case, the target value is set to a value smaller than the torque fluctuation $T_{Fluc}$ of an object whose vibration is to be damped (drive shaft DS) at the time the reference order $q_{ref}$ is equal to the excitation order $q_{tag}$ of the engine EG.

In step S100 of FIG. 8, the moment of inertias $J_1$, $J_2$, the axis-to-axis distances L3, L4, and the mass m as design parameters may be set according to the above expression (2) so that the effective order $q_{eff}$ gradually increases as the amplitude λ of vibration of input torque that is transferred from the engine EG to the driven member 15 increases. That is, with the vibration damping device 20 being designed according to the above expression (2) so that the effective order $q_{eff}$ increases as the amplitude λ of vibration of input torque that is transferred from the engine EG to the driven member 15 increases, the rotational speed range in which the vibration damping capability is degraded due to any deviation of the effective order $q_{eff}$ which occurs as the amplitude λ increases can be shifted toward higher rotation. This restrains degradation in vibration damping capability due to the deviation of the effective order $q_{eff}$ from occurring in the range where the rotational speed Ne is relatively low in the lockup region, and further improves the vibration damping capability in the range where the rotational speed Ne of the engine EG is low.

The vibration damping device 20 may be designed so that the effective order $q_{eff}$ does not vary even if the amplitude λ of vibration of input torque that is transferred from the engine EG to the driven member 15 varies (so that the rate ρ is equal to 0%). This also restrains the vibration damping capability from being degraded by the deviation of the effective order $q_{\mathit{eff}}$ in the range where the rotational speed Ne is relatively low in the lockup region, and improves the vibration damping capability in the range where the rotational speed Ne of the engine EG is low. Moreover, in this case, degradation in vibration damping capability due to the deviation of the effective order $q_{\mathit{eff}}$ is satisfactorily restrained while an increase in moment of inertia J of the inertial mass body 23 and reduction in durability associated with reduction in weight of the crank members 22 are restrained. The vibration damping capability is thus improved while reduction in size and improvement in durability of the vibration damping device 20 are achieved.

In order to design the vibration damping device 20 without depending on particular software, the inventors formed an equation of motion as given by the following expression (4) for the driven member 15 that is one of the objects whose vibration is to be damped, and also formed an equation of motion as given by the following expression (5) for the entire vibration damping device 20.

[Expression 2]

$$J_1 \cdot \ddot{\delta} + (J_2 + m \cdot L_4^2) \cdot (\ddot{\delta} + \ddot{\theta}) + m \cdot L_3^2 \cdot (\ddot{\delta} + \zeta' \cdot \ddot{\theta} + \zeta'' \cdot \dot{\theta}^2) + \\ m \cdot L_4 \cdot L_3 \cdot [2 \cdot \ddot{\delta} + (1+\zeta') \cdot \ddot{\theta} + \zeta'' \cdot \dot{\theta}^2] \cdot \cos(\theta - \zeta) - m \cdot L_4 \cdot L_3 \cdot \\ [2 \cdot (\Omega + \dot{\delta}) + (1+\zeta') \cdot \dot{\theta}](1 - \zeta') \cdot \dot{\theta} \cdot \sin(\theta - \zeta) + k \cdot \delta = T_d \cdot \cos \omega \cdot t \quad (4)$$

$$(J_2 + m \cdot L_4^2) \cdot (\ddot{\delta} + \ddot{\theta}) + m \cdot L_3^2 \cdot \zeta' \cdot (\ddot{\delta} + \zeta' \cdot \ddot{\theta} + \zeta'' \cdot \dot{\theta}^2) + m \cdot L_4 \cdot L_3 \cdot \\ [(1+\zeta') \cdot \ddot{\delta} + 2 \cdot \zeta' \cdot \ddot{\theta} + \zeta'' \cdot \dot{\theta}^2] \cdot \cos(\theta - \zeta) + m \cdot L_4 \cdot L_3 \cdot \\ [(\Omega + \dot{\delta})^2 - \zeta' \cdot \dot{\theta}^2] \cdot (1+\zeta') \cdot \sin(\theta - \zeta) = 0 \quad (5)$$

In the expressions (4) and (5), "$J_1$" represents the moment of inertia of the driven member 15 (first and second driven plates 16, 17), "$J_2$" represents the moment of inertia of the inertial mass body 23, "m" represents the mass (sum) of all (four in the present embodiment) of the crank members 22, and "k" represents stiffness (spring constant) of a system from the engine EG to the driven member 15. In the expressions (4) and (5), "$L_3$" represents the distance between the center of gravity G of the crank member 22 and the fulcrum of swinging of the crank member 22 with respect to the inertial mass body 23, namely the imaginary axis 25, and "$L_4$" represents the distance between the fulcrum of swinging of the crank member 22 with respect to the inertial mass body 23, namely the imaginary axis 25, and the center of rotation RC. In the present embodiment, the distance $L_3$ is the same as the axis-to-axis distance L3, and the distance $L_4$ is the same as the axis-to-axis distance L4.

In the expressions (4) and (5), "$\Omega$" represents the angular velocity of steady rotation of the driven member 15, "$\delta$" represents angular displacement of the driven member 15 from the steady rotation state, "$\zeta$" represents the angle formed by a reference line defined on the first driven plate 16 (driven member 15) and extending in the radial direction of the first driven plate 16 through the center of rotation RC and a line segment from the fulcrum of swinging of the crank member 22 with respect to the inertial mass body 23, namely the imaginary axis 25, to the center of gravity G of the crank member 22 (in the present embodiment, the center of the second coupling shaft 24) (see FIG. 5A), and "$\theta$" represents the angle formed by the reference line and a line segment from the center of rotation RC to the fulcrum of swinging of the crank member 22 with respect to the inertial mass body 23, namely the imaginary axis 25 (see FIG. 5A). In the expressions (4) and (5), "Td" represents the torque that is transferred from the engine EG to the driven member 15, and "$\omega$" represents the frequency of vibration that is transferred from the engine EG to the driven member 15. In the expressions (4) and (5), the symbol "'" represents the first derivative with respect to the angle $\theta$, and the symbol "''" represents the second derivative with respect to the angle $\theta$.

In the present embodiment, the reference line is a straight line (L1) passing through the center of rotation RC and the center of the first coupling shaft 21. The angle $\zeta$ is therefore an angle formed by the straight line (L1) passing through the center of rotation RC and the center of the first coupling shaft 21 and a line segment (L3) from the center of the second coupling shaft 24 to the imaginary axis 25, and the angle $\theta$ is an angle formed by the straight line (L1) passing through the center of rotation RC and the center of the first coupling shaft 21 and a line segment (L4) from the center of rotation RC to the imaginary axis 25. In the expressions (4) and (5), the angle $\eta$ (see FIG. 5A) formed by the reference line, namely the straight line (L1) passing through the center of rotation RC and the center of the first coupling shaft 21, and a line segment (L2) from the center of the first coupling shaft 21 to the center of the second coupling shaft 24, is considered as a function of the angle $\theta$ etc.

When the vibration damping device 20 is in the equilibrium state, the center of the second coupling shaft 24, the center of the imaginary axis 25, and the center of rotation RC of the first driven plate 16 are located on a straight line, and therefore the relationship $\theta = \zeta$ is satisfied. Accordingly, when the angles $\theta$ and $\zeta$ in the equilibrium state are $\theta = \zeta = \theta_0$, $\theta = \theta_0 + \theta \sim$, and $\zeta = \theta_0 + \zeta_0 \cdot \theta \sim$ ("$\theta \sim$" represents variation in angle $\theta$), an equation of motion for the driven member 15 as given by the following expression (6) can be obtained by modifying the above expression (4) by linearization near the equilibrium state, and an equation of motion for the entire vibration damping device 20 as given by the following expression (7) can be obtained by modifying the above expression (5) by linearization near the equilibrium state.

[Expression 3]

$$[J_1 + J_2 + m \cdot (L_4 + L_3)^2] \cdot \ddot{\delta} + J_2 \cdot \ddot{\theta} + k \cdot \delta = T_d \cdot \cos \omega \cdot t \quad (6)$$

$$J_2 \cdot \ddot{\delta} + J_2 \cdot \ddot{\theta} + m \cdot \frac{L_4}{l} \cdot (L_4 + L_3)^2 \cdot \Omega^2 \cdot \theta = 0 \quad (7)$$

Near the equilibrium state, the angular displacement $\delta$ of the driven member 15 from the steady rotation state can be regarded as zero. The natural angular frequency $\omega a$ of the vibration damping device 20 near the equilibrium state as given by the following expression (8) can be obtained by ignoring the first term on the left side of the expression (7). The reference order $q_{\mathit{ref}}$, namely the value to which the effective order $q_{\mathit{eff}}$ converges as the amplitude $\lambda$ of vibration of input torque decreases, as given by the following expression (9) can be obtained from the expression (8).

[Expression 4]

$$\omega_a = \Omega \cdot \sqrt{\frac{m \cdot L_4 \cdot (L_4 + L_3)^2}{J_2 \cdot L_3}} \quad (8)$$

$$q_{\mathit{ref}} = \sqrt{\frac{m \cdot L_4 \cdot (L_4 + L_3)^2}{J_2 \cdot L_3}} \quad (9)$$

Combinations of the moments of inertia $J_1$, $J_2$, the axis-to-axis distances L3, L4, and the mass m which cause the reference order $q_{\mathit{ref}}$ to fall within a proper range that is larger than the excitation order $q_{\mathit{tag}}$ of the engine EG can be easily determined by using the expression (9). By determining the values of the moments of inertia $J_1$, $J_2$, the axis-to-axis distances L3, L4, and the mass m and solving the equations of motion as given by the above expressions (4) and (5), the angular displacement δ of the driven member 15 from the steady rotation state, the angle formed by the reference line and the line segment (L3) from the center of gravity of the crank member 22 (the center of the second coupling shaft 24) to the imaginary axis 25, and the angle θ formed by the reference line and the line segment (L4) from the center of rotation RC to the imaginary axis 25 at the time certain torque Td is transferred from the engine EG to the driven member 15 by the lockup coupling can be derived for a plurality of engine speeds Ne. Moreover, the angle η formed by the reference line and the line segment from the center of the first coupling shaft 21 to the center of the second coupling shaft 24 can be calculated for the plurality of engine speeds Ne based on the derived angle θ etc. By performing numerical calculation using, e.g., a dynamic model of a system from the driven member 15 to the wheels W in a vehicle having the starting device 1 mounted thereon, torque fluctuation that is transmitted to a final object whose vibration is to be damped (the drive shaft DS in this example) can be derived for the plurality of engine speeds Ne based on the angular displacement δ and the angles θ, ζ, and η obtained from the equations of motion as given by the expressions (4) and (5).

Figure 9:
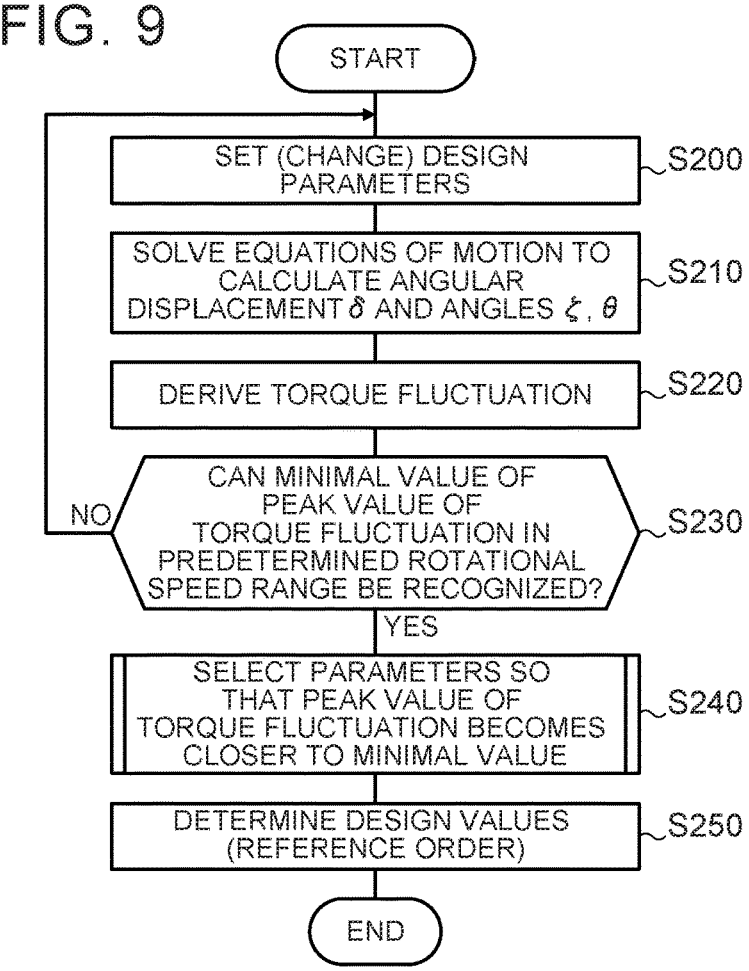
FIG. 9 is a flowchart showing another example of the procedure for designing the vibration damping device of the present disclosure.

Accordingly, even by performing numerical calculation using the equations of motion as given by the expressions (4) and (5), the vibration damping device 20 can be designed so that the reference order $q_{ref}$ is larger than the excitation order $q_{tag}$ of the engine EG. In this case, as shown in FIG. 9, for example, the moments of inertia $J_1$, $J_2$, the axis-to-axis distances L3, L4, and the mass m are first set as design parameters that make the reference order $q_{ref}$ equal to the excitation order $q_{tag}$ or slightly larger than the excitation order $q_{tag}$ (step S200). Next, the equations of motion as given by the expressions (4) and (5) are solved for the design parameters set in step S200 to derive the angular displacement δ and the angles ζ and θ (and the angle η) at the time certain torque Td is transferred to the driven member 15 for a plurality of engine speeds Ne (step S210).

Numerical calculation using, e.g., a dynamic model of a system from the driven member 15 to the wheels W in a vehicle having the starting device 1 mounted thereon is then performed to derive torque fluctuation that is transmitted to an object whose vibration is to be damped (the drive shaft DS in this example) for the plurality of engine speeds Ne based on the angular displacement δ and the angles θ, ζ, and η obtained from the equations of motion as given by the expressions (4) and (5) (step S220). After the processing of step S220, it is determined whether a minimal value MIN of a peak value of torque fluctuation $T_{Fluc}$ in a predetermined rotational speed range (e.g., 1000 to 2000 rpm) can be recognized or not, namely whether the peak value of the torque fluctuation $T_{Fluc}$ has switched from decreasing to increasing or not, in a manner similar to that of step S140 of FIG. 8 (step S230).

If it is determined in step S230 that the minimal value MIN of the peak value of the torque fluctuation $T_{Fluc}$ cannot be recognized, the routine returns to step S200, where the moments of inertia $J_1$, $J_2$, the axis-to-axis distances L3, L4, and the mass m as design parameters are reset (changed) so that the reference order $q_{ref}$ becomes larger than the reference order $q_{ref}$ determined by the design parameters set in the previous step S200. At this time, as described above, only the moment of inertia $J_2$ or the mass m may be changed in order to increase the reference order $q_{ref}$. After the design parameters are reset in this manner, the processing of the above steps S210 to S230 is performed again. That is, the design parameters are set (changed) in step S200 so that the reference order $q_{ref}$ increases, and the processing of steps S210 and S220 is repeated until it is determined in step S230 that the minimal value MIN of the peak value of the torque fluctuation $T_{Fluc}$ can be recognized.

If it is determined in step S230 that the minimal value MIN of the peak value of the torque fluctuation $T_{Fluc}$ can be recognized, the design parameters that make the peak value of the torque fluctuation $T_{Fluc}$ equal to a target value, namely the moments of inertia $J_1$, $J_2$, the axis-to-axis distances L3, L4, and the mass m as design parameters that make the peak value closer to the minimal value MIN or make the peak value equal to the minimal value MIN, are selected in a manner similar to that of step S150 of FIG. 8 (step S240). For example, in step S240 as well, the design parameters (e.g., the moment of inertia $J_2$ or the mass m) are changed so that the reference order $q_{ref}$ becomes larger than the reference order $q_{ref}$ determined by the design parameters immediately before the peak value of the torque fluctuation $T_{Fluc}$ starts to increase, and the torque fluctuation $T_{Fluc}$ is derived in a manner similar to that of steps S210 and S220 to find the design parameters that make the peak value of the torque fluctuation $T_{Fluc}$ in the predetermined rotational speed range equal to the minimal value MIN or to a value close to the minimal value MIN.

The values of the design parameters thus selected, namely the moments of inertia $J_1$, $J_2$, the axis-to-axis distances L3, L4, and the mass m, are determined as design values (step S250). The design for making the reference order $q_{ref}$ larger than the excitation order $q_{tag}$ and making the peak value of the torque fluctuation $T_{Fluc}$ closer to the minimal value MIN is thus completed. The reference order $q_{ref}$ of the vibration damping device 20 is determined according to the values of the moments of inertia $J_1$, $J_2$, the axis-to-axis distances L3, L4, and the mass m determined as design values.

In step S200 of FIG. 9 as well, the design parameters may be automatically set (changed) by software, the design parameters that have been set separately may be input to software, or a plurality of sets of design parameters ($J_1$, $J_2$, L3, L4, m) determined in advance so that the reference order $q_{ref}$ increases may be sequentially set as parameters to be used for numerical analysis. In step S240 of FIG. 9 as well, the design parameters that makes the peak value of the torque fluctuation $T_{Fluc}$ closer to the minimal value MIN may be determined from the design parameters immediately before the peak value of the torque variation $T_{Fluc}$ starts to increase and the design parameters at the time the peak value is starting to increase, in view of mountability of the vibration damping device 20 on the starting device 1 (vehicle) etc. Alternatively, a plurality of design parameters that cause the peak value of the torque fluctuation $T_{Fluc}$ in the predetermined rotational speed range which is derived in step S220 of FIG. 9 to be included in a predetermined target value (allowable range, see near the minimal value MIN in FIG. 7) may be extracted and a parameter that minimizes the peak value of the torque fluctuation $T_{Fluc}$ may be selected as a design value from the plurality of design parameters. In any case, the target value is set to a value smaller than the torque fluctuation $T_{Fluc}$ of an object whose vibration is to be damped (drive shaft DS) at the time the reference order $q_{ref}$ is equal to the excitation order $q_{tag}$ of the engine EG.

In step S200 of FIG. 9, the moment of inertias $J_1$, $J_2$, the axis-to-axis distances L3, L4, and the mass m as design parameters may be set according to the above expression (2)

so that the effective order $q_{eff}$ gradually increases as the amplitude λ of vibration of input torque that is transferred from the engine EG to the driven member 15 increases. This restrains the vibration damping capability from being degraded by the deviation of the effective order $q_{eff}$ in the range where the rotational speed Ne is relatively low in the lockup region, and further improves the vibration damping capability in the range where the rotational speed Ne of the engine EG is low.

By using the expression (9) to set the moments of inertia $J_1$, $J_2$, the axis-to-axis distances L3, L4, and the mass m, the reference order $q_{ref}$ can be easily made to fall within a proper range that is larger than the excitation order $q_{tag}$ of the engine EG, and the vibration damping capability of the vibration damping device 20 can be improved. In the case where torque fluctuation of an object whose vibration is to be damped, which is obtained by numerical calculation using the equations of motion as given by the expressions (4) and (5) etc., falls within an acceptable range, the reference order $q_{ref}$ that is determined by the moments of inertia $J_1$, $J_2$, the axis-to-axis distances L3, L4, and the mass m applied to the numerical calculation and by the expression (9) is larger than the excitation order $q_{tag}$ of the engine EG. The expression (9) therefore need not necessarily be used to determine a plurality of combinations of the moments of inertia $J_1$, $J_2$, the axis-to-axis distances L3, L4, and the mass m.

In the case where a rotary element (in the above embodiment, the entire driven member 15) that rotates together with the first driven plate 16 serving as a support member is a final object whose vibration is to be damped by the vibration damping device 20, torque fluctuation of the rotary element may be derived from the angular displacement δ and the angles ζ and θ which are obtained by solving the equations of motion as given by the above expressions (4) and (5). Moreover, the equation (9) may be used to set a plurality of combinations of the moments of inertia $J_1$, $J_2$, the axis-to-axis distances L3, L4, and the mass m as design parameters in step S110 of FIG. 8.

Figure 10:
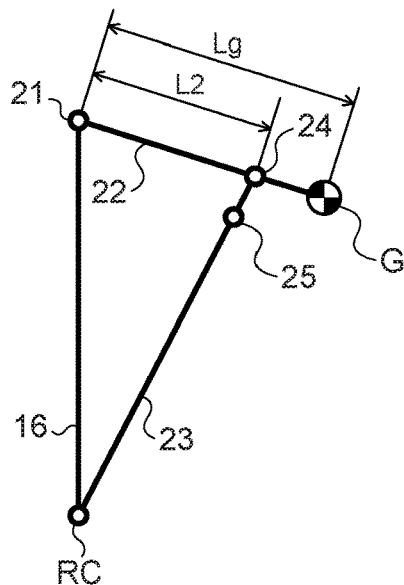
FIG. 10 is a schematic view illustrating another vibration damping device of the present disclosure.

As shown in FIG. 10, the vibration damping device 20 may be configured to satisfy the relationship Lg>L2. This configuration increases the load that acts on the support portion (bearing portion) of the first coupling shaft 21 as compared to the case where the vibration damping device 20 satisfies the relationship Lg=L2, but further increases a restoring force Fr that acts on the crank member 22 due to leverage. In this case, the center of gravity G need not necessarily be located on a straight line passing through the centers of the first and second coupling shafts 21, 24.

Figure 11:
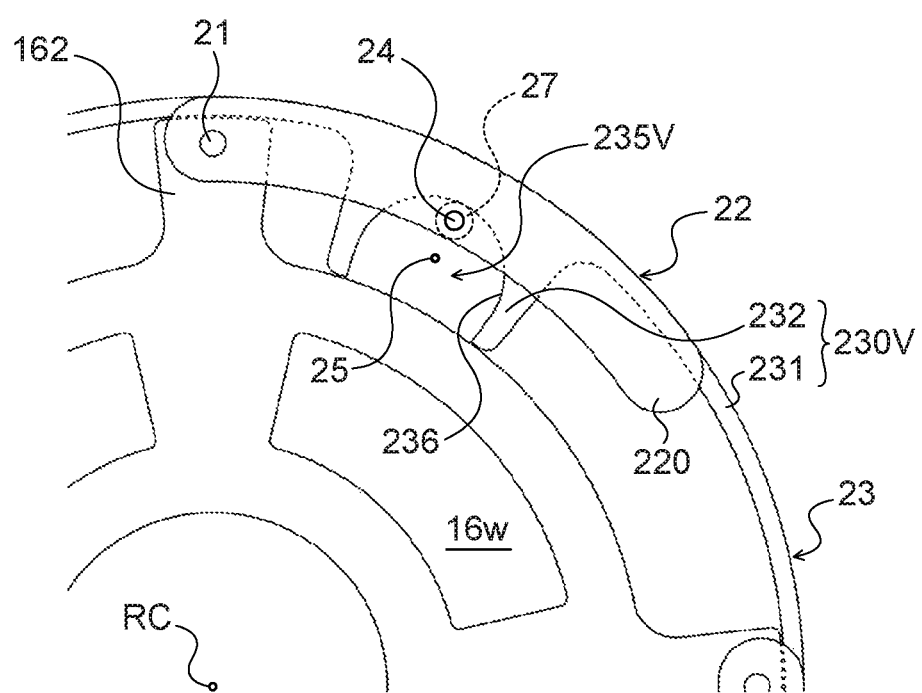
FIG. 11 is a schematic view illustrating a further vibration damping device of the present disclosure.

The guide portions 235 may be formed in the crank members 22, and the second coupling shafts 24 may be supported by the inertial mass body 23. The guide portion 235 includes the convex support surface 237 facing the guide surface 236 and the stopper surfaces 238. However, the support surface 237 and the stopper surfaces 238 may be omitted as shown in FIG. 11. A guide portion 235V formed in a protruding portion 232 of an annular member 230V shown in FIG. 11 is an approximately semicircular cutout having a concave (concave cylindrical) guide surface 236 with a constant radius of curvature. This configuration simplifies the structure of the guide portion 235V that guides the second coupling shaft 24 and thus the structure of the vibration damping device 20. A guide portion similar to the guide portion 235V may be formed in the plate members 220 of the crank member 22. The guide surface 236 may be, e.g., a concave surface whose radius of curvature varies stepwise or gradually as long as the guide surface 236 moves the second coupling shaft 24 in a manner described above.

The annular inertial mass body 23 may be configured to be rotatably supported (aligned) by the first driven plate 16. This configuration allows the inertial mass body 23 to smoothly swing about the center of rotation RC of the first driven plate 16 when the crank members 22 swing.

In the vibration damping device 20, the annular inertial mass body 23 may be replaced with a plurality of (e.g., four) mass bodies having the same specifications (dimensions, weight, etc.). In this case, the mass bodies may be, e.g., metal sheets having a circular arc planar shape and each coupled to the first driven plate 16 via the crank member 22 (two plate members 220), the second coupling shaft 24, and the guide portions 235 so that the mass bodies are located at intervals (regular intervals) in the circumferential direction in the equilibrium state and swing about the center of rotation RC. In this case, guide portions each receiving a centrifugal force (centrifugal oil pressure) acting on the mass body and guiding the mass body so that the mass body swings about the center of rotation RC may be formed in the outer peripheral portion of the first driven plate 16.

The vibration damping device 20 may include dedicated support members (first links) each swingably supporting the crank member 22 and forming a turning pair with the crank member 22 and also forming a turning pair with the inertial mass body 23. That is, the crank members 22 may be indirectly coupled to a rotary element via the dedicated support members as first links. In this case, the support members of the vibration damping device 20 need only to be coaxially coupled to a rotary element whose vibration is to be damped, such as, e.g., the drive member 11, the intermediate member 12, or the first driven plate 16 of the damper device 10, so that the support members rotate together with the rotary element. The vibration damping device 20 with this configuration can satisfactorily damp vibration of the rotary element.

Figure 12:
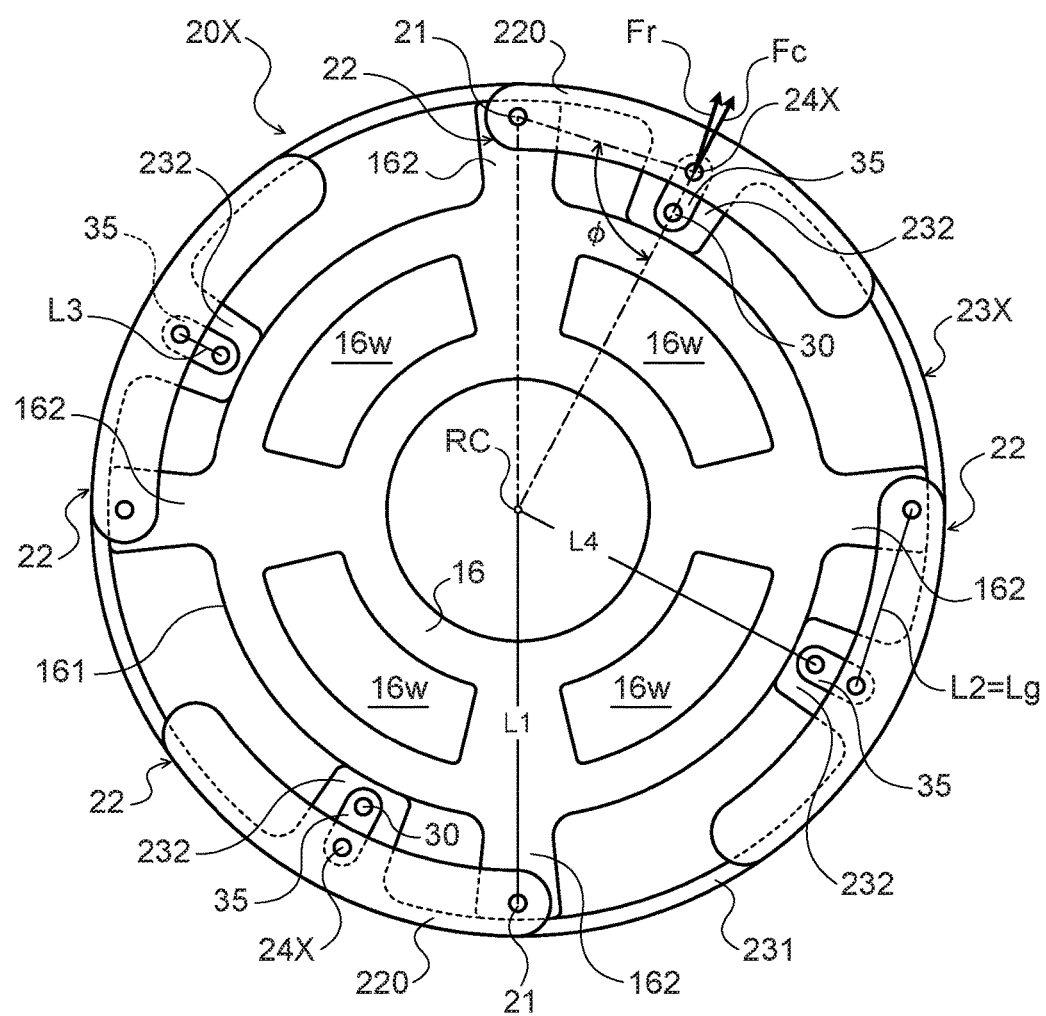
FIG. 12 is a front view of a further vibration damping device of the present disclosure.

As in a vibration damping device 20X shown in FIG. 12, the guide portions 235 of the vibration damping device 20 may be omitted, and connecting rods 35 shown in the figure may be used instead of the guide portions 235. Each connecting rod 35 is rotatably coupled to the crank member 22 via a second coupling shaft 24X and is rotatably coupled to a protruding portion 232 of an inertial mass body 23X via a third coupling shaft 30. This vibration damping device 20X also has functions and effects similar to those of the vibration damping device 20 when designed based on the above expression (1) or (2). In the vibration damping device 20X as well, the design values of the moments of inertia $J_1$, $J_2$, the axis-to-axis distances L3, L4, and the mass m can be determined by, e.g., numerical calculation using software such as LMS Imagine.Lab Amesim described above or numerical calculation using the equations of motion as given by the above expressions (4) and (5) etc.

Figure 13:
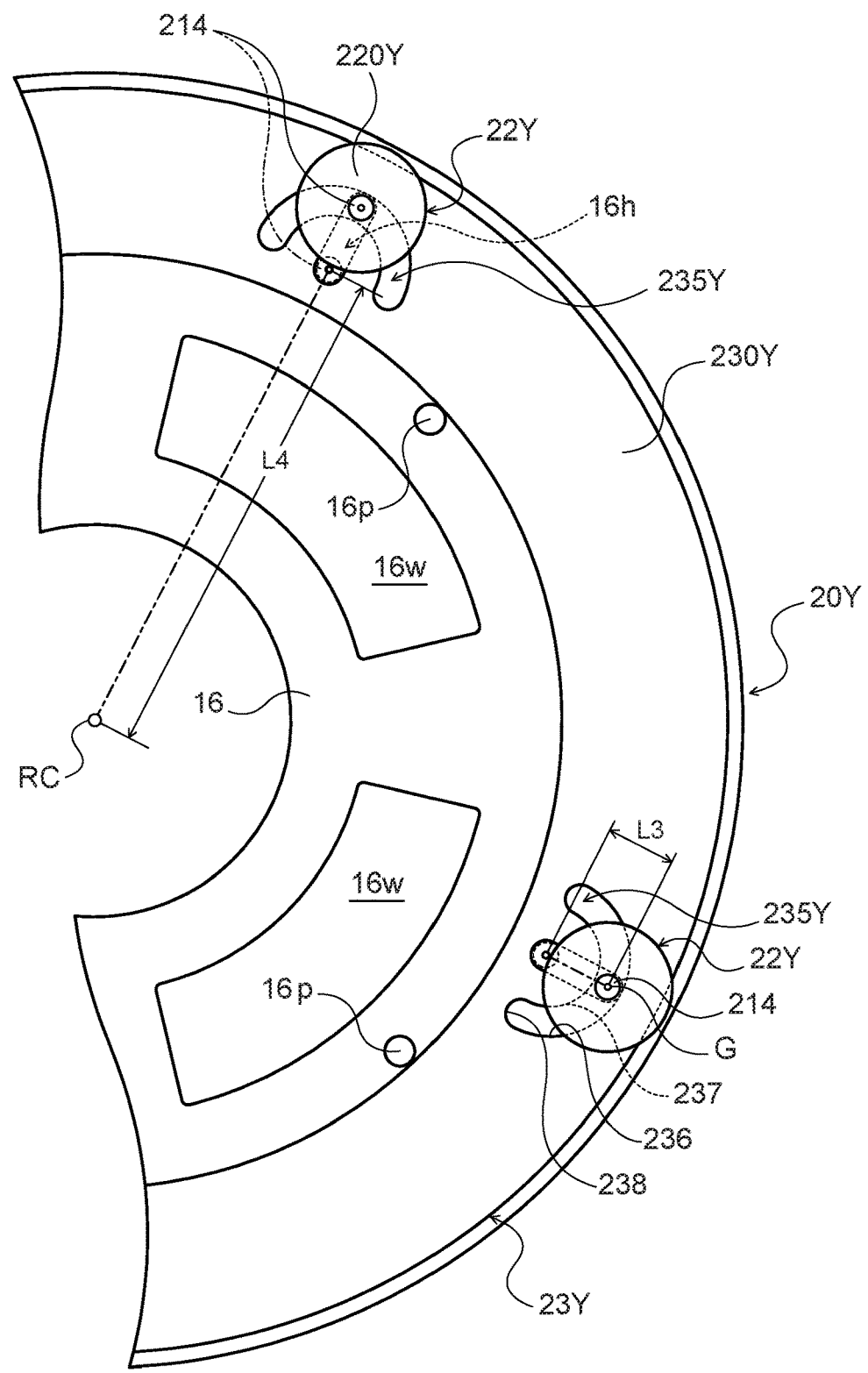
FIG. 13 is an enlarged view of a further vibration damping device of the present disclosure.
Figure 14:
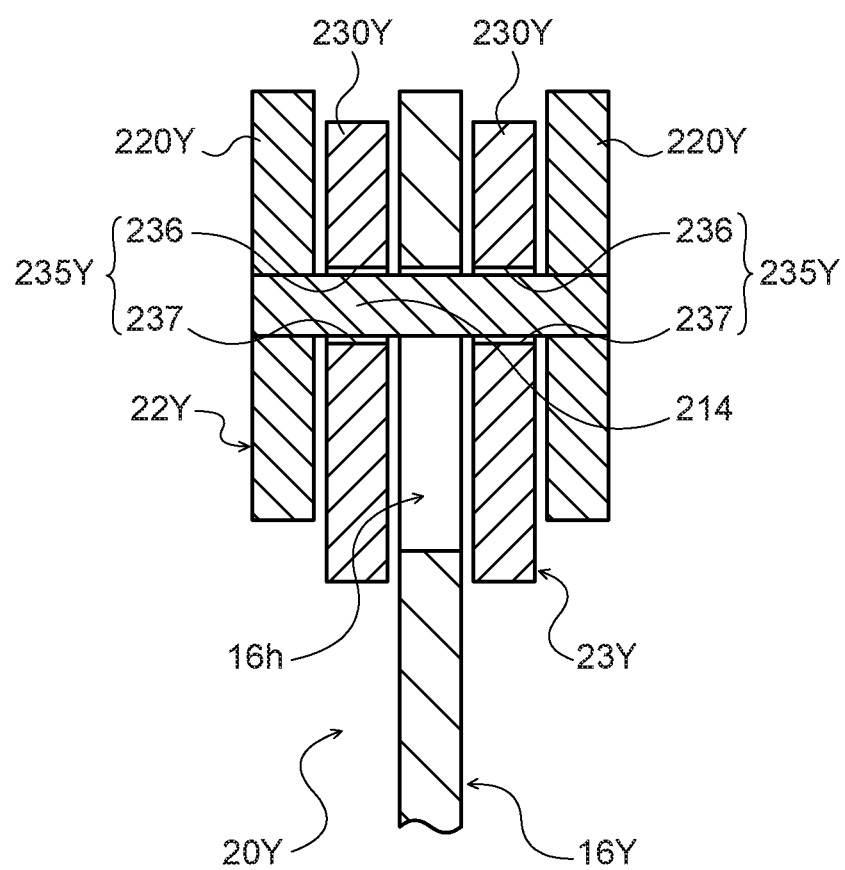
FIG. 14 is an enlarged sectional view of a main part of the vibration damping device shown in FIG. 13.

FIG. 13 is an enlarged view of a further vibration damping device 20Y of the present disclosure, and FIG. 14 is an enlarged sectional view of a main part of the vibration damping device 20Y. The vibration damping device 20Y shown in these figures includes a driven plate 16Y configured similarly to the first driven plate 16 and serving as a support member, a plurality of (e.g., four in the present embodiment) weight bodies 22Y each rotatably coupled to the first driven plate 16 via a coupling shaft (coupling member) 214 and serving as a restoring force generating member, and a single annular inertial mass body 23Y coupled to the driven plate 16Y and the weight bodies 22Y via the coupling shafts 214.

As shown in FIGS. 13 and 14, the driven plate 16Y has a plurality of (e.g., four at 90° intervals in the present embodiment) long holes (through holes) 16*h* (first guide portions) formed in its outer peripheral portion at intervals (regular intervals) in the circumferential direction. As shown in the figures, each long hole 16*h* guides the coupling shaft 214 formed in the shape of a solid (or hollow) round bar, namely guides the weight body 22Y, and is formed in the driven plate 16Y so that the central axis of the long hole 16*h* in the longitudinal direction extends in the radial direction of the driven plate 16Y and passes through the center of rotation RC. The width (inside dimension in the direction perpendicular to the longitudinal direction) of the long hole 16*h* is designed to be slightly larger than the outside diameter of the coupling shaft 214. As shown in FIG. 14, each weight body 22Y has two plate members 220Y coupled to each other via the coupling shaft 214. In the present embodiment, each plate member 220Y is made of a metal sheet and has the shape of a disc. The coupling shaft 214 is fixed (coupled) to the two plate members 220Y so that its axis passes through the center of gravity G of the weight body 22Y.

The inertial mass body 23Y includes two annular members 230Y made of a metal sheet, and the weight of the inertial mass body 23Y (two annular members 230Y) is designed to be sufficiently heavier than that of a single weight body 22Y. As shown in FIGS. 13 and 14, each annular member 230Y has a plurality of (e.g., four at 90° intervals in the present embodiment) guide portions 235Y (second guide portions) formed at intervals (regular intervals) in the circumferential direction. Each guide portion 235Y is a circular arc-shaped opening and guides the coupling shaft 214, namely the weight body 22Y.

As shown in the figures, the guide portion 235Y includes a concave guide surface 236, a convex support surface 237 located closer to the inner periphery of the annular member 230Y (closer to the center of the annular member 230Y) than the guide surface 236 is and facing the guide surface 236, and two stopper surfaces 238 located on both sides of the guide surface 236 and the support surface 237 and continuous with the guide surface 236 and the support surface 237. In the present embodiment, the guide surface 236 is a concave cylindrical surface with a constant radius of curvature. The support surface 237 is a circular arc-shaped convex surface, and the stopper surfaces 238 are circular arc-shaped concave surfaces. The interval between the guide surface 236 and the support surface 237 is designed to be slightly larger than the outside diameter of the coupling shaft 214. As shown in FIG. 13, the guide portion 235Y (the guide surface 236, the support surface 237, and the stopper surfaces 238) is symmetric with respect to a straight line passing through the center of curvature of the guide surface 236 and the center of the annular member 230Y (the center of rotation RC of the driven plate 16Y).

As shown in FIG. 14, the two annular members 230Y are disposed on both sides in the axial direction of the driven plate 16Y, one on each side, and coaxially with the driven plate 16Y so that corresponding ones of the guide portions 235Y face each other in the axial direction of the annular members 230Y. The inner peripheral surfaces of the two annular members 230Y are supported by a plurality of projections 16*p* (see FIG. 13) formed on the driven plate 16Y so as to project in the axial direction. Each annular member 230Y (inertial mass body 23Y) is thus supported by the driven plate 16Y so that it can rotate about the center of rotation RC.

The two plate members 220Y are disposed so as to face each other in the axial direction via the corresponding driven plate 16Y and the two annular members 230, and are coupled to each other via the coupling shafts 214. As shown in FIG. 14, each coupling shaft 214 coupling the two plate members 220Y extends through a corresponding one of the long holes 16*h* in the driven plate 16Y and a corresponding one of the guide portions 235Y in each of the two annular members 230Y. The driven plate 16Y, the weight bodies 22Y, and the inertial mass body 23Y are thus coupled via the coupling shafts 214, and each coupling shaft 214 can move along both a corresponding one of the long holes 16*h* in the driven plate 16Y and corresponding ones of the guide portions 235Y in the inertial mass body 23Y.

In such a vibration damping device 20Y, each weight body 22Y (coupling shaft 214) forms a sliding pair with the driven plate 16Y and the inertial mass body 23Y, and the driven plate 16Y and the inertial mass body 23Y form a turning pair. The driven plate 16Y having the long holes 16*h*, the plurality of weight bodies 22Y, and the inertial mass body 23Y having the guide portions 235Y thus form a slider crank mechanism (double slider crank chain). The equilibrium state of the vibration damping device 20Y is the state where each coupling shaft 214 is located in the middle of the guide portions 235Y in the circumferential direction and at the radially outer end of the long hole 16*h* (see FIG. 13).

When the driven plate 16Y of the vibration damping device 20Y starts rotating in the equilibrium state, each coupling shaft 214 coupling the two plate members 220Y is pressed against the guide surfaces 236 of the guide portions 235Y in the inertial mass body 23Y due to a centrifugal force acting on the weight body 22Y and rolls or slides on the guide surfaces 236 toward one ends of the guide portions 235Y. In addition, as the driven plate 16Y rotates, each coupling shaft 214 moves in the radial direction of the driven plate 16Y along the long hole 16*h* of the driven plate 16Y toward the radially inner end of the long hole 16*h*. When the coupling shaft 214 reaches the one ends of the guide portions 235Y and the radially inner end of the long hole 16*h*, a component of the centrifugal force acting on the weight body 22Y acts as a restoring force that returns the coupling shaft 214 to its position in the equilibrium state. Each coupling shaft 214 thus rolls or slides on the guide surfaces 236 toward the other ends of the guide portions 235Y and moves in the radial direction of the driven plate 16Y along the long hole 16*h* toward the radially outer end of the long hole 16*h*.

Accordingly, when the driven plate 16Y rotates, each weight body 22Y reciprocates (swings) relative to the driven plate 16Y in the radial direction within the long hole 16*h* and reciprocates (swings) relative to the inertial mass body 23Y along the guide portions 235Y. The inertial mass body 23Y thus swings (reciprocating rotary motion) about the center of rotation RC of the first driven plate 16 with the movement (swinging) of the weight bodies 22Y. Vibration in opposite phase from vibration transmitted from the engine EG to the drive member 11 is thus applied from the swinging inertial mass body 23 to the driven plate 16Y via each guide portion 235Y and each coupling shaft 214, whereby vibration of the driven plate 16Y can be dampened.

The vibration damping device 20Y as described above also has functions and effects similar to those of the vibration damping devices 20, 20X when designed based on the above expression (1) or (2). That is, the vibration damping device 20Y that is a slider crank mechanism may be designed based on the following expression (10) or (11) in which "Lg/L2" in the expression (1) or (2) is Lg/L2=1 so that the effective order $q_{eff}$ does not vary even when the amplitude of vibration of input torque that is transferred from the engine EG to the driven member 15 varies or so that the effective order $q_{\mathit{eff}}$ increases as the amplitude λ increases. In this case, in the expression (10) or (11), "L3" represents the distance between the center of gravity G of the weight body 22Y and the fulcrum of swinging of the weight body 22Y along the guide portions 235Y (second guide portions), and "L4" represents the distance between the fulcrum of swinging of the weight body 22Y along the guide portions 235Y and the center of rotation RC (see FIG. 13). In the present embodiment, the fulcrum of swinging of the weight body 22Y along the guide portions 235Y is the same as the center of curvature of the guide surfaces 236 (guide portions 235Y).

$$L4/(L3+L4)=\alpha+\beta\cdot n+\gamma \quad (10)$$

$$L4/(L3+L4)>\alpha+\beta\cdot n+\gamma \quad (11)$$

For the vibration damping device 20Y, an equation of motion as given by the following expression (12) can be formed for the driven member 15 that is one of objects whose vibration is to be damped, and an equation of motion as given by the following expression (13) can be formed for the entire vibration damping device 20Y.

[Expression 5]

$$(J_1+J_2+m\cdot r^2)\cdot\ddot{\delta}+J_2\cdot\varepsilon'\cdot\ddot{\tau}+J_2\cdot\varepsilon''\cdot\dot{\tau}^2-2\cdot m\cdot L_4\cdot L_3\cdot(\Omega+\dot{\delta})\cdot\dot{\tau}\cdot\sin\tau+k\cdot\delta=T_d\cdot\cos\omega\cdot t \quad (12)$$

$$J_2\cdot\varepsilon'\cdot\ddot{\delta}+(J_2\cdot\varepsilon'^2+m\cdot r^2)\cdot\ddot{\tau}+(J_2\cdot\varepsilon'\cdot\varepsilon''+m\cdot r'\cdot r'')\cdot\dot{\tau}^2+m\cdot L_4\cdot L_3\cdot(\Omega+\dot{\delta})^2\cdot\sin\tau=0 \quad (13)$$

In the expressions (12) and (13), "$J_1$" represents the moment of inertia of the driven member 15 (first and second driven plates 16, 17), "$J_2$" represents the moment of inertia of the inertial mass body 23, "m" represents the mass (sum) of all (four in the present embodiment) of the weight bodies 22Y, and "k" represents stiffness (spring constant) of a system from the engine EG to the driven member 15. In the expressions (12) and (13), "$L_3$" represents the distance between the center of gravity G of the weight body 22Y and the fulcrum of swinging of the weight body 22Y along the guide portions 235Y (second guide portions), "$L_4$" represents the distance between the fulcrum of swinging of the weight body 22Y along the guide portions 235Y and the center of rotation RC, and "r" represents the distance between the center of gravity G of the weight body 22Y and the center of rotation RC.

Moreover, in the expressions (12) and (13), "Ω" represents the angular velocity of steady rotation of the driven member 15, "δ" represents angular displacement of the driven member 15 from the steady rotation state, "ε" represents the angle formed by a line segment from the center of rotation RC to the fulcrum of swinging of the weight body 22Y along the guide portions 235Y and a line segment from the center of rotation RC to the center of gravity G of the weight body 22Y, and "τ" represents the angle formed by a straight line passing through the center of rotation RC and the fulcrum of swinging of the weight body 22Y along the guide portions 235Y and a line segment from the fulcrum of swinging of the weight body 22Y along the guide portions 235Y to the center of gravity G of the weight body 22Y. In the expressions (12) and (13) as well, "Td" represents the torque that is transferred from the engine EG to the driven member 15, and "ω" represents the frequency of vibration that is transmitted from the engine EG to the driven member 15. In the expressions (12) and (13) as well, the symbol "'" represents the first derivative with respect to the angle θ, and the symbol "''" represents the second derivative with respect to the angle θ.

A linearized equation of motion for the driven member 15 as given by the following expression (14) can be obtained and a linearized equation of motion for the entire vibration damping device 20Y as given by the following expression (15) can be obtained by linearizing the expressions (12) and (13) with the angle δ and the angle τ being very small. The angular displacement δ of the driven member 15 from the steady rotation state can be regarded as zero near the equilibrium state. Accordingly, the natural angular frequency ωa of the vibration damping device 20Y near the equilibrium state as given by the above expression (8) can be obtained by ignoring the first term on the left side of the expression (15). For the vibration damping device 20Y as well, the reference order $q_{\mathit{ref}}$, namely the value to which the effective order $q_{\mathit{eff}}$ converges as the amplitude λ of vibration of input torque decreases, as given by the above expression (9) can be obtained from the expression (8).

[Expression 6]

$$[J_1+J_2+m\cdot(L_4+L_3)^2]\cdot\ddot{\delta}+J_2\cdot\frac{L_3}{L_4+L_3}\cdot\ddot{\tau}+k\cdot\delta=T_a\cdot\cos\omega\cdot t \quad (14)$$

$$J_2\cdot\frac{L_3}{L_4+L_3}\cdot\ddot{\delta}+J_2\cdot\left(\frac{L_3}{L_4+L_3}\right)^2\cdot\ddot{\tau}+m\cdot L_4\cdot L_3\cdot\Omega^2\cdot\tau=0 \quad (15)$$

By performing numerical calculation using the equations of motion as given by the above expressions (12) and (13) and the above expression (9), the vibration damping device 20Y can be designed so that the reference order $q_{\mathit{ref}}$ is larger than the excitation order $q_{\mathit{tag}}$ of the engine EG. In this case as well, the design values of the moments of inertia $J_1$, $J_2$, the axis-to-axis distances L3, L4, and the mass m which make the reference order $q_{\mathit{ref}}$ larger than the excitation order $q_{\mathit{tag}}$ and make the peak value of the torque fluctuation $T_{\mathit{Fluc}}$ closer to the minimal value MIN can be obtained by performing processing similar to that shown in FIG. 8 or 9. The reference order $q_{\mathit{ref}}$ of the vibration damping device 20 is determined according to the design values of the moments of inertia $J_1$, $J_2$, the axis-to-axis distances L3, L4, and the mass m thus determined.

Figure 15:
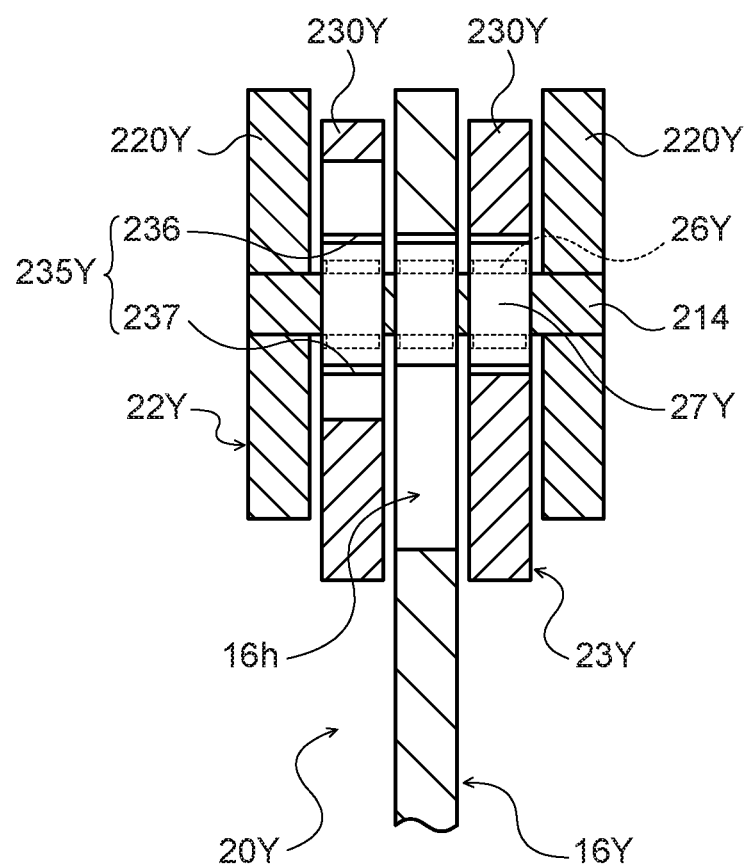
FIG. 15 is an enlarged sectional view of a main part of a modification of the vibration damping device shown in FIG. 13.

As shown in FIG. 15, the vibration damping device 20Y may have a plurality of cylindrical outer rings 27Y each rotatably supported by the coupling shaft 214 via a plurality of rollers (or balls, namely rolling elements) 26Y and forming a rolling bearing. In the example shown in FIG. 15, three outer rings 27Y are attached to each coupling shaft 214 so as to roll or slide on the inner surface of the long hole 16h of the driven plate 16Y and the guide portions 235Y (guide surfaces 236) of the inertial mass body 23Y (annular members 230Y). This allows each weight body 22Y and the inertial mass body 23Y to swing more smoothly.

Figure 16:
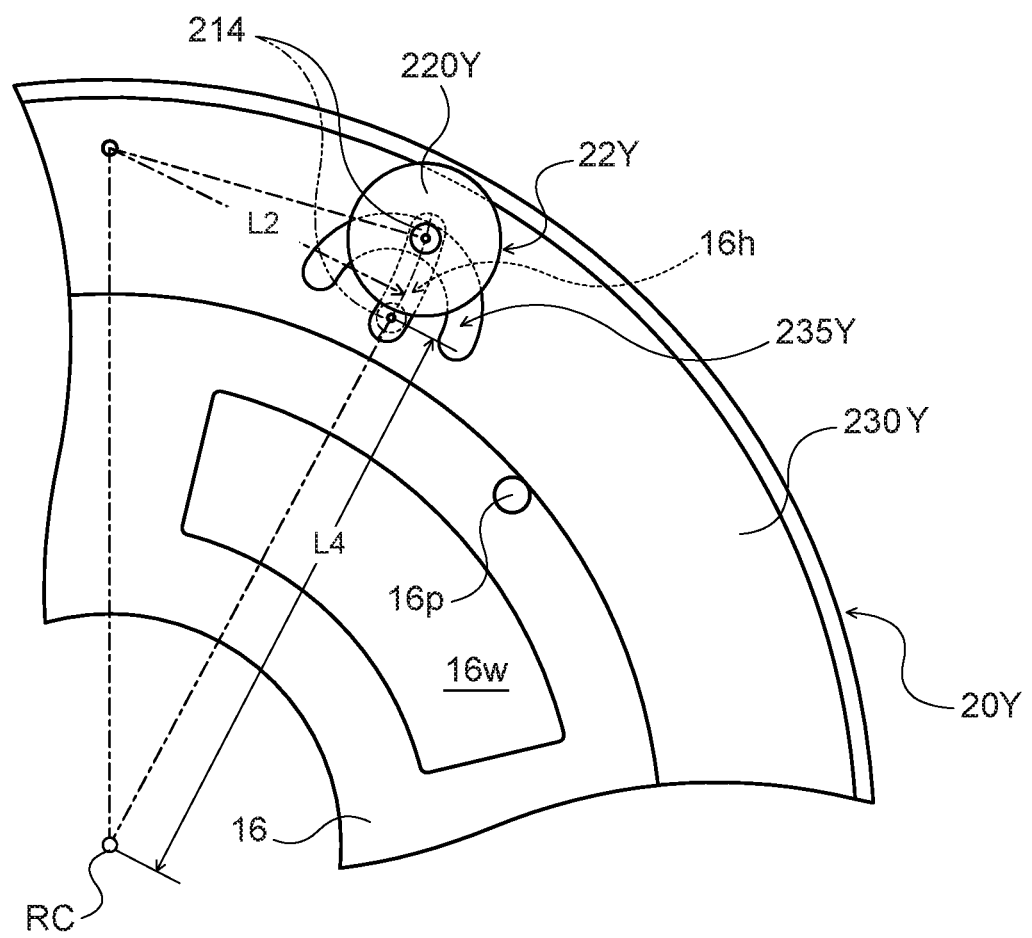
FIG. 16 is an enlarged view of a main part of another modification of the vibration damping device shown in FIG. 13.

In the vibration damping device 20Y, the guide surface 236 of the guide portion 235Y is a concave cylindrical surface with a constant radius of curvature. However, the guide surface 236 may be a concave surface whose radius of curvature varies stepwise or gradually. The support surface 237 and the stopper surfaces 238 may be omitted from the guide portion 235Y. In the vibration damping device 20Y, the inertial mass body 23Y need not necessarily be supported by the driven plate 16Y so that the inertial mass body 23Y can rotate about the center of rotation RC. The inertial mass body 23 can be made to swing symmetrically by forming the long holes 16h in the driven plate 16Y so that the central axis of each long hole 16h extends in the radial direction of the driven plate 16Y and passes through the center of rotation RC. However, the present disclosure is not limited to this. That is, as shown in FIG. 16, the long holes 16h may be formed in the driven plate 16Y so that the central axis of each long hole 16h has the shape of a circular arc. In this case, as shown in FIG. 16, the vibration damping device 20Y can be made to operate similarly to the vibration damping device 20 by placing the center of curvature of the central axis of each long hole 16h on the central axis of the first coupling shaft 21 in the vibration damping device 20 and making the radius of curvature of the central axis of each long hole 16h equal to the axis-to-axis distance L2 between the first coupling shaft 21 and the second coupling shaft 24 in the vibration damping device 20.

Figure 17:
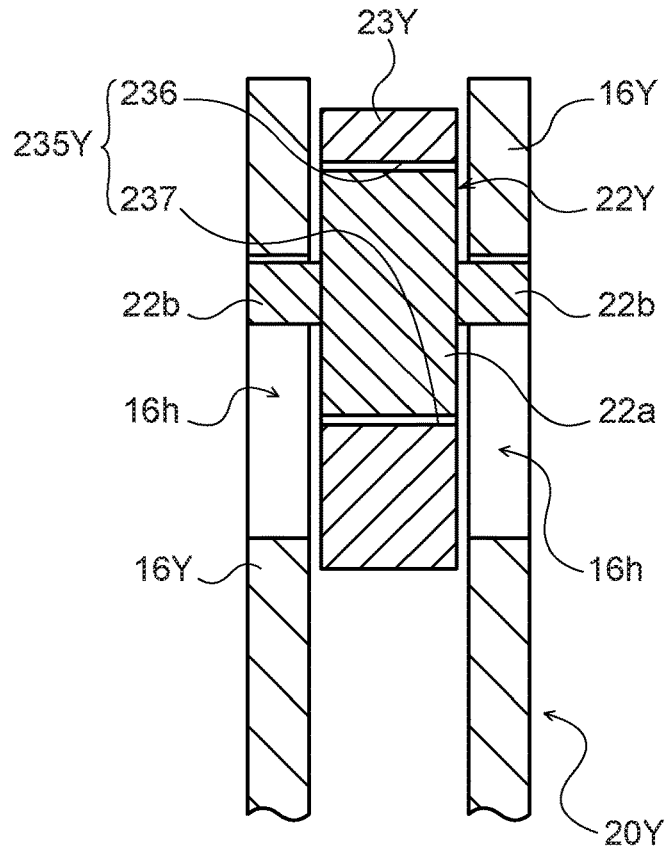
FIG. 17 is an enlarged view of a main part of a modification of the vibration damping device shown in FIG. 13.

As shown in FIG. 17, the vibration damping device 20Y that is a slider crank mechanism may include two driven plates 16Y serving as support members, an inertial mass body 23Y that is a single annular member disposed between the two driven plates 16Y in the axial direction, and a plurality of weight bodies 22Y each guided by long holes 16h in each driven plate 16Y and a guide portion 235 (guide surface 236) of the inertial mass body 23Y. In this case, as shown in the figure, the weight body 22Y may include a large diameter body 22a that is guided by the guide portion 235Y of the inertial mass body 23Y and shaft portions 22b extended to both sides in the axial direction from the body 22a so that each shaft portion 22b is guided by the long hole 16h in a corresponding one of the driven plates 16Y.

In the vibration damping device 20Y, guide portions (second guide portions) corresponding to the guide portions 235Y may be formed in the weight bodies 22Y, and the coupling shafts 214 may be coupled (fixed) to the inertial mass body 23Y. Moreover, first guide portions corresponding to the long holes 16h may be formed in the weight bodies 22Y. In this case, the second guide portions corresponding to the guide portions 235Y may be formed in either the driven plates 16Y (support members) or the weight bodies 22Y, and the coupling shafts 214 may be disposed in either the driven plates 16Y or the weight bodies 22Y where the second guide portions are not formed. The first guide portions corresponding to the long holes 16h may be formed in the inertial mass body 23Y. In this case, the second guide portions corresponding to the guide portions 235Y may be formed in either the driven plates 16Y or the weight bodies 22Y, and the coupling shafts 214 may be disposed in either the driven plates 16Y or the weight bodies 22Y where the second guide portions are not formed.

Figure 18:
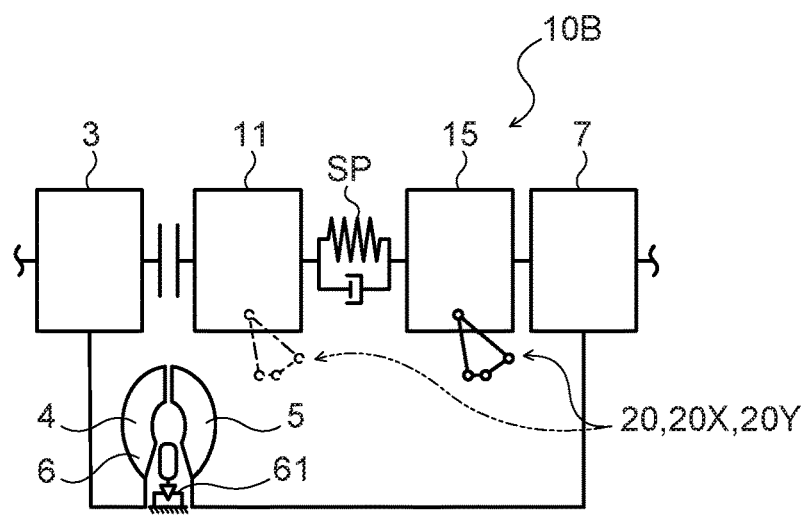
FIG. 18 is a schematic configuration diagram of a modification of the damper device including the vibration damping device of the present disclosure.

The vibration damping device 20, 20X, 20Y may be coupled to the intermediate member 12 of the damper device 10 or may be coupled to the drive member (input element) 11 (see long dashed double-short dashed lines in FIG. 1). The vibration damping device 20, 20X, 20Y may be applied to a damper device 10B shown in FIG. 18. The damper device 10B of FIG. 18 corresponds to the damper device 10 having the intermediate member 12 omitted therefrom. The damper device 10B includes a drive member (input element) 11 and a driven member 15 (output element) as rotary elements and includes springs SP disposed between the drive member 11 and the driven member 15 as torque transfer elements. In this case, the vibration damping device 20, 20X, 20Y may be coupled to the driven member 15 of the damper device 10B as shown in the figure or may be coupled to the drive member 11 as shown by long dashed double-short dashed lines in the figure.

Figure 19:
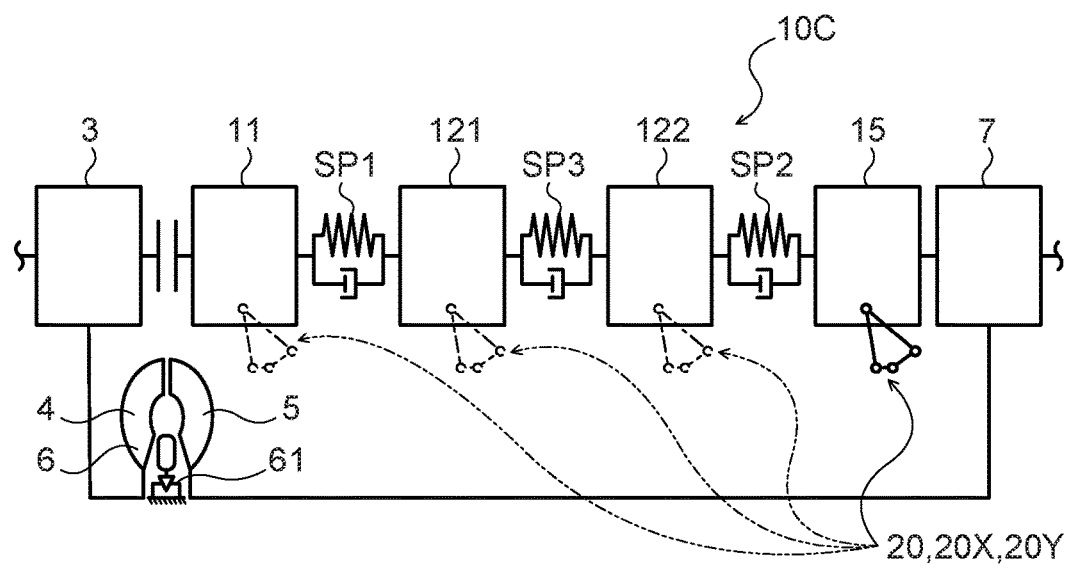
FIG. 19 is a schematic configuration diagram of another modification of the damper device including the vibration damping device of the present disclosure.

The vibration damping device 20, 20X, 20Y may be applied to a damper device 10C shown in FIG. 19. The damper device 10C of FIG. 19 includes a drive member (input element) 11, a first intermediate member (first intermediate element) 121, a second intermediate member (second intermediate element) 122, and a driven member (output element) 15 as rotary elements, and includes first springs SP1 disposed between the drive member 11 and the first intermediate member 121, second springs SP2 disposed between the second intermediate member 122 and the driven member 15, and third springs SP3 disposed between the first intermediate member 121 and the second intermediate member 122 as torque transfer elements. In this case, the vibration damping device 20, 20X, 20Y may be coupled to the driven member 15 of the damper device 10C as shown in the figure, or may be coupled to the first intermediate member 121, the second intermediate member 122, or the drive member 11 as shown by long dashed double-short dashed lines in the figure. In any case, coupling the vibration damping device 20, 20X, 20Y to the rotary element of the damper device 10, 10B, 10C allows vibration to be very satisfactorily damped by both the damper device 10 to 10C and the vibration damping device 20, 20X, 20Y while restraining an increase in weight of the damper device 10 to 10C.

As described above, a vibration damping device of the present disclosure is a vibration damping device (20, 20X, 20Y) including a support member (16, 16Y) that rotates, together with a rotary element (15) to which torque from an engine (EG) is transferred, about a center of rotation (RC) of the rotary element (15), a restoring force generating member (22, 22Y) that is coupled to the support member (16, 16Y) and that is swingable as the support member (16, 16Y) rotates, and an inertial mass body (23, 23X, 23Y) that is coupled to the support member (16, 16Y) via the restoring force generating member (22, 22Y) and that swings, with motion of the restoring force generating member (22, 22Y), about the center of rotation (RC) as the support member (16, 16Y) rotates, wherein moments of inertia $J_1$, $J_2$, mass m, and distances $L_3$ and $L_4$ are determined so that torque fluctuation of an object for which vibration is to be damped, which is derived based on angular displacement $\delta$ and angles $\zeta$ and $\theta$ obtained by solving the above expressions (4) and (5), is equal to a target value.

As described above, studies conducted by the inventors show that, in vibration damping devices including a restoring force generating member and an inertial mass body that swings with motion of the restoring force generating member, vibration damping capability can be improved by making a reference order, namely a value to which an order of the vibration damping device converges as amplitude of vibration of input torque decreases, larger than an excitation order of the engine rather than by making the reference order equal to the excitation order. In the vibration damping device of the present disclosure, the moments of inertia $J_1$, $J_2$, the mass m, and the distances $L_3$ and $L_4$ are determined so that the torque fluctuation of the object for which vibration is to be damped, which is derived based on the angular displacement $\delta$ and the angles $\zeta$ and $\theta$ obtained by solving the above expressions (4) and (5), is equal to the target value. In the vibration damping device of the present disclosure, the reference order can thus be made to fall within a proper range that is larger than the excitation order of the engine, whereby the vibration damping capability is further improved.

The target value may be defined as a value that is smaller than the torque fluctuation of the object at the time a reference order ($q_{ref}$), namely a convergence value of an order of the vibration damping device (20, 20X, 20Y), is equal to an excitation order ($q_{tag}$) of the engine (EG).

The vibration damping device may be designed to satisfy $1.00 \times q_{tag} < q_{ref} \leq 1.03 \times q_{tag}$, more preferably $1.01 \times q_{tag} \leq q_{ref} \leq 1.02 \times q_{tag}$, where "$q_{ref}$" represents the reference order and "$q_{tag}$" represents the excitation order. This very satisfactorily improves the vibration damping capability of the vibration damping device including the restoring force generating member and the inertial mass body that swings with motion of the restoring force generating member.

The vibration damping device may be designed so that the order ($q_{eff}$) of the vibration damping device increases or does not vary as amplitude (λ) of vibration of the input torque increases. Accordingly, even if any deviation of the order of the vibration damping device occurs as the amplitude of the vibration of the input torque increases, degradation in vibration damping capability due to the deviation of the order is restrained from occurring in a low engine speed range. The vibration damping capability in the low engine speed range is thus further improved.

The vibration damping device (20) may further include: a first coupling shaft (21) that couples the support member (16) and the restoring force generating member (22) so as to allow the support member (16) and the restoring force generating member (22) to rotate relative to each other; a second coupling shaft (24) that is supported by one of the restoring force generating member (22) and the inertial mass body (23) and that couples the restoring force generating member (22) and the inertial mass body (23) so as to allow the restoring force generating member (22) and the inertial mass body (23) to rotate relative to each other; and a guide portion (235, 235X) that is formed in the other of the restoring force generating member (22) and the inertial mass body (23) and that, as the support member (16) rotates, guides the second coupling shaft (24) so that the second coupling shaft (24) swings about the first coupling shaft (21) while maintaining a constant axis-to-axis distance (L1) to the first coupling shaft (21) and also swings about an imaginary axis (25) while maintaining a constant axis-to-axis distance ($L_3$) to the imaginary axis (25), the imaginary axis (25) being defined so that a position of the imaginary axis (25) relative to the inertial mass body (23) does not change. This further improves the vibration damping capability while restraining an increase in overall weight and size of the vibration damping device.

The vibration damping device (20X) may further include: a connecting member (35) that is rotatably coupled to the restoring force generating member (22) via a second coupling shaft (24) and is rotatably coupled to the inertial mass body (23X) via a third coupling shaft (30).

The vibration damping device (20, 20X) may satisfy $L1+L2>L_3+L4$, where "L1" represents an axis-to-axis distance between the center of rotation (RC) of the rotary element (15) and the first coupling shaft (21), "L2" represents the axis-to-axis distance between the first coupling shaft (21) and the second coupling shaft (24, 24X), "$L_3$" represents the axis-to-axis distance between the second coupling shaft (24, 24X) and the third coupling shaft (25, 30), and "L4" represents an axis-to-axis distance between the third coupling shaft (25, 30) and the center of rotation (RC). This significantly reduces the influence of the weight of the restoring force generating member on equivalent mass of the vibration damping device and further improves flexibility in setting equivalent stiffness and equivalent mass, namely the excitation order of vibration. The vibration damping capability is thus very satisfactorily improved while an increase in weight and size of the restoring force generating member and thus an increase in overall weight and size of the vibration damping device are restrained.

The vibration damping device (20Y) may further include: a first guide portion (16h) that is formed in one of the support member (16Y), the restoring force generating member (22Y), and the inertial mass body (23Y) and extends in the radial direction of the support member (16Y); and a second guide portion (235Y) that is formed in one of the two other than the one of the support member (16Y), the restoring force generating member (22Y), and the inertial mass body (23Y) and has a shape of a circular arc, wherein the other of the two other than the one of the support member (16Y), the restoring force generating member (22Y), and the inertial mass body (23Y) may be guided by the first and second guide portions (16h, 235Y). In this vibration damping device as well, by increasing the order of the vibration damping device as the amplitude of vibration of input torque increases, the vibration damping capability is further improved while an increase in overall weight and size of the device is restrained.

The support member (16, 16Y) may rotate coaxially and together with one of rotary elements of a damper device (10, 10B, 10C) having a plurality of rotary elements (11, 12, 121, 122, 15) including at least an input element (11) and an output element (15) and an elastic body (SP, SP1, SP2, SP3) that transfers the torque between the input element (11) and the output element (15). Coupling the vibration damping device to the rotary element of the damper device in this manner allows vibration to be very satisfactorily damped by both the damper device and the vibration damping device while restraining an increase in weight of the damper device.

The output element (15) of the damper device (10, 10B, 10C) may be operatively (directly or indirectly) coupled to an input shaft (IS) of a transmission (TM).

A method for designing a vibration damping device according to the present disclosure is a method for designing a vibration damping device (20, 20X, 20Y) including a support member (16, 16Y) that rotates, together with a rotary element (15) to which torque from an engine (EG) is transferred, about a center of rotation (RC) of the rotary element (15), a restoring force generating member (22, 22Y) that is coupled to the support member (16, 16Y) and that is swingable as the support member (16, 16Y) rotates, and an inertial mass body (23, 23X, 23Y) that is coupled to the support member (16, 16Y) via the restoring force generating member (22, 22Y) and that swings, with motion of the restoring force generating member (22, 22Y), about the center of rotation (RC) as the support member (16, 16Y) rotates. The method comprises determining moments of inertia $J_1$, $J_2$, mass m, and distances $L_3$ and $L_4$ so that torque fluctuation of an object for which vibration is to be damped, which is derived based on angular displacement δ and angles ζ and θ obtained by solving the above expressions (4) and (5), is equal to a target value.

Designing the vibration damping device by this method allows a reference order, namely a convergence value of an order of the vibration damping device, to fall within a proper range that is larger than an excitation order of the engine and thus further improves vibration damping capability.

The target value may be defined as a value that is smaller than the torque fluctuation of the object at the time a reference order ($q_{ref}$), namely a convergence value of an order of the vibration damping device (20, 20X, 20Y), is equal to an excitation order ($q_{tag}$) of the engine (EG).

The torque fluctuation may be derived by changing the moments of inertias $J_1$, $J_2$, the mass m, and the distances $L_3$ and $L_4$ so that the reference order ($q_{ref}$), namely the convergence value of the order of the vibration damping device (20, 20X, 20Y), increases, and the moments of inertias $J_1$, $J_2$, the mass m, and the distances $L_3$ and L4 which make a peak value of the torque fluctuation in a predetermined rotational speed range equal to a minimal value or to a value close to the minimal value may be used as design values.

The invention of the present disclosure is not limited in any way to the above embodiments, and it is to be understood that various modifications may be made without departing from the spirit and scope of the present disclosure. The modes for carrying out the invention described above merely show specific forms of the invention described in the section "SUMMARY" and are not intended to limit the elements of the invention described in the section "SUMMARY."

INDUSTRIAL APPLICABILITY

The invention of the present disclosure can be utilized in the field of manufacture of vibration damping devices that damp vibration of the rotary elements.

The invention claimed is:

1. A vibration damping device including a support member that rotates, together with a rotary element to which torque from an engine is transferred, about a center of rotation of the rotary element, a restoring force generating member that is coupled to the support member and that is swingable as the support member rotates, and an inertial mass body that is coupled to the support member via the restoring force generating member and that swings, with motion of the restoring force generating member, about the center of rotation as the support member rotates, wherein
moments of inertia $J_1$, $J_2$, mass m, and distances $L_3$ and $L_4$ are determined so that torque fluctuation of an object for which vibration is to be damped, which is derived based on angular displacement δ and angles ζ and θ obtained by solving the following expressions (1) and (2), is equal to a target value

[Expression 1]

$$J_1 \cdot \ddot{\delta} + (J_2 + m - L_4^2) \cdot (\ddot{\delta} + \ddot{\theta}) + m \cdot L_3^2 \cdot (\ddot{\delta} + \ddot{\zeta} \cdot \ddot{\theta} + \ddot{\zeta}'' \cdot \dot{\theta}^2) + \\ m \cdot L_4 \cdot L_3 \cdot [2 \cdot \ddot{\delta} + (1 + \zeta') \cdot \ddot{\theta} + \zeta'' \cdot \dot{\theta}^2] \cdot \cos(\theta - \zeta) - m \cdot L_4 \cdot L_3 \cdot \\ [2 \cdot (\Omega + \dot{\delta}) + (1 + \zeta') \cdot \dot{\theta}] \cdot (1 - \zeta') \cdot \dot{\theta} \cdot \sin(\theta - \zeta) + k \cdot \delta = T_d \cos \omega \cdot r \quad (1)$$

$$(J_2 + m - L_4^2) \cdot (\ddot{\delta} + \ddot{\theta}) + m \cdot L_3^2 \cdot \ddot{\zeta} \cdot (\ddot{\delta} + \ddot{\zeta} \cdot \ddot{\theta} + \ddot{\zeta}'' \cdot \dot{\theta}^2) + m \cdot L_4 \cdot L_3 \cdot \\ [(1 + \zeta') \cdot \ddot{\delta} + 2 \cdot \ddot{\zeta} \cdot \ddot{\theta} + \ddot{\zeta}'' \cdot \dot{\theta}^2] \cdot \cos(\theta - \zeta) + m \cdot L_4 \cdot L_3 \cdot \\ [(\Omega + \dot{\delta})^2 - \ddot{\zeta} \cdot \dot{\theta}^2] \cdot (1 + \zeta') \cdot \sin(\theta - \zeta) = 0 \quad (2)$$

where "$L_3$" represents a distance between a center of gravity of the restoring force generating member and a fulcrum of swinging of the restoring force generating member with respect to the inertial mass body, "$L_4$" represents a distance between the fulcrum and the center of rotation, "$J_1$" represents a moment of inertia of the rotary element and the support member, "$J_2$" represents a moment of inertia of the inertial mass body, "m" represents mass of the restoring force generating member, "k" represents stiffness of a system from the engine to the rotary element, "Ω" represents an angular velocity of steady rotation of the rotary element, "δ" represents angular displacement of the rotary element from a steady rotation state, "ζ" represents an angle formed by a reference line defined on the support member and extending in a radial direction of the support member through the center of rotation and a line segment from the fulcrum of swinging of the restoring force generating member with respect to the inertial mass body to the center of gravity of the restoring force generating member, "θ" represents an angle formed by the reference line and a line segment from the center of rotation to the fulcrum, "Td" represents torque that is transferred from the engine to the rotary element, and "ω" represents a frequency of vibration that is transmitted from the engine to the rotary element.

2. The vibration damping device according to claim 1, wherein
the target value is defined as a value that is smaller than the torque fluctuation of the object at the time a reference order, namely a convergence value of an order of the vibration damping device, is equal to an excitation order of the engine.

3. The vibration damping device according to claim 2, wherein
the vibration damping device satisfies $1.00 \times q_{tag} < q_{ref} \leq 1.03 \times q_{tag}$, where "$q_{ref}$" represents the reference order and "$q_{tag}$" represents the excitation order.

4. The vibration damping device according to claim 2, wherein
the vibration damping device satisfies $1.01 \times q_{tag} \leq q_{ref}$ $1.02 \times q_{tag}$, where "$q_{ref}$" represents the reference order and "$q_{tag}$" represents the excitation order.

5. The vibration damping device according to claim 2, wherein the vibration damping device is designed so that an order of the vibration damping device increases or does not vary as amplitude of vibration of the input torque increases.

6. The vibration damping device according to claim 2, further comprising:
a first guide portion that is formed in one of the support member, the restoring force generating member, and the inertial mass body and extends in the radial direction of the support member; and
a second guide portion that is formed in one of the two other than the one of the support member, the restoring force generating member, and the inertial mass body and has a shape of a circular arc, wherein
the other of the two other than the one of the support member, the restoring force generating member, and the inertial mass body is guided by the first and second guide portions.

7. The vibration damping device according to claim 2, wherein
the support member rotate coaxially and together with one of rotary elements of a damper device having a plurality of rotary elements including at least an input element and an output element and an elastic body that transfers the torque between the input element and the output element.

8. The vibration damping device according to claim 1, wherein
the vibration damping device satisfies $1.00 \times q_{tag} < q_{ref} \leq 1.03 \times q_{tag}$, where "$q_{ref}$" represents the reference order and "$q_{tag}$" represents the excitation order.

9. The vibration damping device according to claim 1, wherein
the vibration damping device satisfies $1.01 \times q_{tag} \leq q_{ref}$ $1.02 \times q_{tag}$, where "$q_{ref}$" represents the reference order and "$q_{tag}$" represents the excitation order.

10. The vibration damping device according to claim 1, wherein
the vibration damping device is designed so that an order of the vibration damping device increases or does not vary as amplitude of vibration of the input torque increases.

11. The vibration damping device according to claim 1, further comprising:
a first coupling shaft that couples the support member and the restoring force generating member so as to allow the support member and the restoring force generating member to rotate relative to each other;
a second coupling shaft that is supported by one of the restoring force generating member and the inertial mass body and that couples the restoring force generating member and the inertial mass body so as to allow the restoring force generating member and the inertial mass body to rotate relative to each other; and
a guide portion that is formed in the other of the restoring force generating member and the inertial mass body and that, as the support member rotates, guides the second coupling shaft so that the second coupling shaft swings about the first coupling shaft while maintaining a constant axis-to-axis distance to the first coupling shaft and also swings about a third coupling shaft while maintaining a constant axis-to-axis distance to the third coupling shaft, the third coupling shaft being an imaginary axis defined so that a position of the imaginary axis relative to the inertial mass body does not change.

12. The vibration damping device according to claim 11, wherein
the vibration damping device satisfies L1+L2>L3+L4, where "L1" represents an axis-to-axis distance between the center of rotation of the rotary element and the first coupling shaft, "L2" represents the axis-to-axis distance between the first coupling shaft and the second coupling shaft, "L3" represents the axis-to-axis distance between the second coupling shaft and the third coupling shaft, and "L4" represents an axis-to-axis distance between the third coupling shaft and the center of rotation.

13. The vibration damping device according to claim 1, further comprising:
a connecting member that is rotatably coupled to the restoring force generating member via a second coupling shaft and is rotatably coupled to the inertial mass body via a third coupling shaft.

14. The vibration damping device according to claim 1, further comprising:
a first guide portion that is formed in one of the support member, the restoring force generating member, and the inertial mass body and extends in the radial direction of the support member; and
a second guide portion that is formed in one of the two other than the one of the support member, the restoring force generating member, and the inertial mass body and has a shape of a circular arc, wherein
the other of the two other than the one of the support member, the restoring force generating member, and the inertial mass body is guided by the first and second guide portions.

15. The vibration damping device according to claim 1, wherein
the support member rotate coaxially and together with one of rotary elements of a damper device having a plurality of rotary elements including at least an input element and an output element and an elastic body that transfers the torque between the input element and the output element.

16. The vibration damping device according to claim 15, wherein
the output element of the damper device is operatively coupled to an input shaft of a transmission.

17. A method for designing a vibration damping device including a support member that rotates, together with a rotary element to which torque from an engine is transferred, about a center of rotation of the rotary element, a restoring force generating member that is coupled to the support member and that is swingable as the support member rotates, and an inertial mass body that is coupled to the support member via the restoring force generating member and that swings, with motion of the restoring force generating member, about the center of rotation as the support member rotates, the method comprising
determining moments of inertia $J_1$, $J_2$, mass m, and distances $L_3$ and $L_4$ so that torque fluctuation of an object for which vibration is to be damped, which is derived based on angular displacement δ and angles ζ and θ obtained by solving the following expressions (1) and (2), is equal to a target value

[Expression 2]

$$J_1 \cdot \ddot{\delta} + (J_2 + m \cdot L_4^2) \cdot (\ddot{\delta} + \ddot{\theta}) + m \cdot L_3^2 \cdot (\ddot{\delta} + \ddot{\zeta}' \cdot \ddot{\theta} + \ddot{\zeta}'' \cdot \dot{\theta}^2) + m \cdot L_4 \cdot L_3 \cdot [2 \cdot \ddot{\delta} + (1 + \zeta') \cdot \ddot{\theta} + \zeta'' \cdot \dot{\theta}^2] \cdot \cos(\theta - \zeta) - m \cdot L_4 \cdot L_3 \cdot [2 \cdot (\Omega + \dot{\delta}) + (1 + \zeta') \cdot \dot{\theta}](1 - \zeta') \cdot \dot{\theta} \cdot \sin(\theta - \zeta) + k \cdot \delta = T_d \cdot \cos \omega \cdot t \quad (4)$$

$$(J_2 + m \cdot L_4^2) \cdot (\ddot{\delta} + \ddot{\theta}) + m \cdot L_3^2 \cdot (\ddot{\delta} + \ddot{\zeta}' \cdot \ddot{\theta} + \ddot{\zeta}'' \cdot \dot{\theta}^2) + m \cdot L_4 \cdot L_3 \cdot [(1 + \zeta') \cdot \ddot{\delta} + 2 \cdot \zeta' \cdot \ddot{\theta} + \zeta'' \cdot \dot{\theta}^2] \cdot \cos(\theta - \zeta) + m \cdot L_4 \cdot L_3 \cdot [(\Omega + \dot{\delta})^2 - \zeta' \cdot \dot{\theta}^2] \cdot (1 + \zeta') \cdot \sin(\theta - \zeta) = 0 \quad (5)$$

where "$L_3$" represents a distance between a center of gravity of the restoring force generating member and a fulcrum of swinging of the restoring force generating member with respect to the inertial mass body,
"$L_4$" represents a distance between the fulcrum and the center of rotation,
"$J_1$" represents a moment of inertia of the rotary element and the support member,
"$J_2$" represents a moment of inertia of the inertial mass body,
"m" represents mass of the restoring force generating member,
"k" represents stiffness of a system from the engine to the rotary element,
"Ω" represents an angular velocity of steady rotation of the rotary element,
"δ" represents angular displacement of the rotary element from a steady rotation state,
"ζ" represents an angle formed by a reference line defined on the support member and extending in a radial direction of the support member through the center of rotation and a line segment from the fulcrum of swinging of the restoring force generating member with respect to the inertial mass body to the center of gravity of the restoring force generating member,
"θ" represents an angle formed by the reference line and a line segment from the center of rotation to the fulcrum,
"Td" represents torque that is transferred from the engine to the rotary element, and
"ω" represents a frequency of vibration that is transmitted from the engine to the rotary element.

18. The method for designing a vibration damping device according to claim 17, wherein
the target value is defined as a value that is smaller than the torque fluctuation of the object at the time a reference order, namely a convergence value of an order of the vibration damping device, is equal to an excitation order of the engine.

19. The method for designing a vibration damping device according to claim 18, wherein
the torque fluctuation is derived by changing the moments of inertias $J_1$, $J_2$, the mass m, and the distances $L_3$ and $L_4$ so that a reference order, namely a convergence value of an order of the vibration damping device, increases, and the moments of inertias $J_1$, $J_2$, the mass m, and the distances $L_3$ and $L_4$ which make a peak value of the torque fluctuation in a predetermined rotational speed range equal to a minimal value or to a value close to the minimal value are used as design values.

20. The method for designing a vibration damping device according to claim 17, wherein
the torque fluctuation is derived by changing the moments of inertias $J_1$, $J_2$, the mass m, and the distances $L_3$ and $L_4$ so that a reference order, namely a convergence value of an order of the vibration damping device, increases, and the moments of inertias $J_1$, $J_2$, the mass m, and the distances $L_3$ and $L_4$ which make a peak value of the torque fluctuation in a predetermined rotational speed range equal to a minimal value or to a value close to the minimal value are used as design values.

* * * * *